US009876933B2

(12) United States Patent
Sei

(10) Patent No.: US 9,876,933 B2
(45) Date of Patent: Jan. 23, 2018

(54) JOB PROCESSING SYSTEM, JOB PROCESSING APPARATUS, AND PROGRAM

(71) Applicant: KONICA MINOLTA, INC., Chiyoda-ku, Tokyo (JP)

(72) Inventor: Ryou Sei, Hino (JP)

(73) Assignee: Konica Minolta, Inc., Chiyoda-ku (JP)

( * ) Notice: Subject to any disclaimer, the term of this patent is extended or adjusted under 35 U.S.C. 154(b) by 0 days.

(21) Appl. No.: 15/354,184

(22) Filed: Nov. 17, 2016

(65) Prior Publication Data
US 2017/0155794 A1    Jun. 1, 2017

(30) Foreign Application Priority Data

Nov. 27, 2015  (JP) ................................ 2015-232278

(51) Int. Cl.
| G06F 3/12 | (2006.01) |
| H04N 1/32 | (2006.01) |
| H04N 1/00 | (2006.01) |

(52) U.S. Cl.
CPC ....... *H04N 1/32512* (2013.01); *G06F 3/1205* (2013.01); *G06F 3/1231* (2013.01); *G06F 3/1255* (2013.01); *G06F 3/1268* (2013.01); *H04N 1/00973* (2013.01); *H04N 2201/0075* (2013.01); *H04N 2201/0094* (2013.01); *H04N 2201/3223* (2013.01)

(58) Field of Classification Search
CPC ........... H04N 1/32512; H04N 1/00973; H04N 2201/0075; H04N 2201/0094; H04N 2201/3223; G06F 3/1205; G06F 3/1231; G06F 3/1255; G06F 3/1268
USPC ....................................... 358/1.13
See application file for complete search history.

(56) References Cited

U.S. PATENT DOCUMENTS

| 2014/0285845 A1* | 9/2014 | Ishikawa | ............ H04N 1/00204 358/1.15 |
| 2015/0163369 A1* | 6/2015 | Komaba | ............ H04N 1/00469 358/1.15 |

FOREIGN PATENT DOCUMENTS

| JP | 2010-085801 | 4/2010 |
| JP | 2013-005341 | 1/2013 |
| JP | 2015-136812 A | 7/2015 |

OTHER PUBLICATIONS

Notice of Reasons for Rejection issued in corresponding Japanese Patent Application No. 2015-232278, dated Nov. 7, 2017, with English Translation (32 pages).

* cited by examiner

*Primary Examiner* — Neil R McLean
(74) *Attorney, Agent, or Firm* — Buchanan Ingersoll & Rooney PC

(57) ABSTRACT

A job processing system includes: a job processing apparatus configured to execute an input job; and a plurality of terminals configured to receive an operation to set a job to be input to the job processing apparatus including: a processor configured to have a function of acquiring setting information indicating setting contents of a job for which a terminal has received a setting operation from a user by a first method and a second method; and a saving unit configured to save job setting information, the processor being configured to determine whether a first job setting operation is to be taken over by another terminal, and combine first job setting information with setting information about a job corresponding to a job setting operation received from a user by another terminal, and the job processing apparatus accepting an input of the first job.

28 Claims, 15 Drawing Sheets

JOB PROCESSING SYSTEM, JOB PROCESSING APPARATUS, AND PROGRAM

The entire disclosure of Japanese Patent Application No. 2015-232278 filed on Nov. 27, 2015 including description, claims, drawings, and abstract are incorporated herein by reference in its entirety.

BACKGROUND OF THE INVENTION

Field of the Invention

The present invention relates to a job processing system that accepts, through an external terminal, an operation to set a job to be input to a job processing apparatus. The present invention also relates to the job processing apparatus and a program for the system or the apparatus.

Description of the Related Art

Jobs can be remotely input to some job processing apparatuses such as image forming apparatuses and multifunction peripherals that execute jobs including copy jobs and print jobs. In such a remote job operation, a remote operation panel or a mobile terminal that is independent of any job processing apparatus is used.

Methods that can be used in inputting a job from a terminal to an apparatus include the first method and the second method described below.

By the first method, the data of an operation screen is transmitted from the apparatus to a terminal. The terminal that has received the data displays the operation screen, and accepts an operation from a user through the operation screen. When an operation is received, location information indicating the location of the operation on the operation screen is transmitted to the apparatus. The apparatus that has received the location information from the terminal recognizes the contents of the operation received from the user, in accordance with information about the operation screen transmitted to the terminal and the location information received from the terminal.

By the second method, a terminal displays an operation screen for accepting a job input. When an operation is accepted through the operation screen, the terminal recognizes the contents of the operation. The terminal then creates setting information about the corresponding job, and transmits the setting information to the apparatus. For example, when a job input operation is completed, the terminal creates job setting information that reflects the contents of all the operations accepted so far, and transmits the job setting information to the apparatus.

JP 2015-136812 A discloses a technology relating to an image forming apparatus having operation panels that can be attached to the apparatus in a detachable manner. In this image forming apparatus, IDs are allotted to the respective operation panels. When a job is to be input from an operation panel to the apparatus, the job and the ID of the operation panel are transmitted to the apparatus. In this manner, a job that has been input from an operation panel with an ID can be suspended or aborted only from an operation panel having the same ID, and can be suspended or aborted from a privileged operation panel having a different ID.

In a case where a job is input from a terminal using the first method, the data of an operation screen needs to be transmitted from the apparatus to the terminal, every time the operation screen changes or switches to a different state upon receipt of a user operation. Furthermore, every time the terminal receives an operation, the location information about the operation is transmitted to the apparatus. As a result, data is frequently transmitted through wireless communication by the first method, and therefore, many operations are affected by communication failures.

By either of the first and second methods, the battery might run out during a job input operation.

When a job input operation is suspended or aborted due to such a failure, all the operations performed so far are discarded, and a large amount of labor is wasted if complicated settings have been made.

In view of this, it would be convenient if a job input operation that has been partially completed by one terminal can be taken over and continued by another terminal. However, a job input operation can be transferred only between terminals using the same method.

For example, in a case where a communication failure occurs during a job input operation with a terminal using the first method, and this operation is to be taken over by another terminal, a similar communication failure is highly likely to occur, and the take-over will fail, if the terminal to take over uses the same first method. In a case where a failure occurs during a job input operation with a terminal using the second method, the only other terminal that can be used might be a terminal using the first method. Therefore, operation takeovers only between terminals using the same method are inconvenient.

SUMMARY OF THE INVENTION

The present invention has been made to solve the above problems, and an object thereof is to provide a job processing system in which a job input operation from a remote terminal can be taken over by a terminal using a different method from that used by the remote terminal, a job processing apparatus, and a program for the system or the apparatus.

The summary of the present invention for achieving the above object lies in the following Items of the invention.

[1] To achieve the abovementioned object, according to an aspect, a job processing system reflecting one aspect of the present invention comprises:

a job processing apparatus configured to execute an input job; and a plurality of terminals configured to receive, from a user, an operation to set a job to be input to the job processing apparatus, wherein the job processing apparatus includes:

a processor configured to have: a function of acquiring setting information indicating setting contents of a job for which a terminal has received a setting operation from a user by a first method, the first method being designed for: transmitting data of an operation screen to a terminal and causing the terminal to display the operation screen; receiving, from the terminal, location information indicating a location of an operation received from a user through the operation screen, the location being on the operation screen; and recognizing contents of the operation received by the terminal from the user, in accordance with the received location information and information about the operation screen; and a function of acquiring setting information indicating setting contents of a job for which a terminal has received a setting operation from a user by a second method, the second method being different from the first method; and a saving unit configured to save job setting information acquired from a terminal by the processor, wherein the processor is configured to:

determine whether a first job setting operation being accepted by one terminal using one of the first method and the second method is to be taken over by another terminal using the other one of the first method and the second method; and combine first job setting information acquired from the one terminal and saved in the saving unit, with setting information about a job corresponding to a job setting operation received from a user by another terminal using the other method, when the processor determines that the first job input operation being accepted by the one terminal is to be taken over by another terminal using the other method, and wherein the job processing apparatus accepts an input of the first job in accordance with the setting information combined by the processor.

In the above embodiment of the present invention or the embodiment described below in Item. 10 or 19, an operation being accepted by a terminal using the first method can be taken over by a terminal using the second method, or an operation being accepted by a terminal using the second method can be taken over by a terminal using the first method.

[2] The job processing system of Item. 1, wherein the second method is preferably a method by which a terminal recognizes setting contents of a job corresponding to a job setting operation accepted from a user, and the terminal preferably transmits setting information indicating the recognized setting contents of the job to the job processing apparatus.

In the above embodiment of the present invention or the embodiment described below in Item. 11 or 20, a terminal using the second method identifies (recognizes) the contents of an operation.

[3] The job processing system of Item. 1 or 2, wherein, when receiving a predetermined switch instruction from a user, the processor preferably determines that the first job setting operation being accepted by the one terminal is to be taken over by another terminal using the other method.

In the above embodiment of the present invention or the embodiment described below in Item. 12 or 21, an operation is taken over in accordance with an instruction from a user.

[4] The job processing system of Item. 1 or 2, wherein, when receiving setting information about the same job as the first job from the another terminal, the processor preferably determines that the first job setting operation being accepted by the one terminal is to be taken over by the another terminal.

In the above embodiment of the present invention or the embodiment described below in Item. 13 or 22, an operation is taken over if the job is the same.

[5] The job processing system of Item. 1 or 2, wherein, when the same user as the user performing the first job setting operation on the one terminal performs a job setting operation on the another terminal, the processor preferably determines that the first job setting operation being accepted by the one terminal is to be taken over by the another terminal.

In the above embodiment of the present invention or the embodiment described below in Item. 14 or 23, an operation is taken over if the user is the same.

[6] The job processing system of any one of Items. 1 to 5, wherein when the one terminal uses the first method, the processor preferably converts the first job setting information saved in the saving unit into data in a predetermined format recognizable to the another terminal using the second method, and transmits the data and a combining instruction to the another terminal, the another terminal preferably receives the data and the combining instruction, creates and displays an operation screen reflecting the setting information indicated by the data, accepts the rest of the first job setting operation from the user, and, when the first job setting operation is completed, creates and transmits first job setting information reflecting all setting operations to the job processing apparatus, and the job processing apparatus preferably accepts the input of the first job in accordance with the first job setting information received from the another terminal.

In the above embodiment of the present invention or the embodiment described below in Item. 15 or 24, an operation screen that reflects the contents of an operation being accepted by a terminal using the first method is displayed on a terminal that uses the second method and is to take over the operation, and the terminal using the second method takes over the rest of the operation, so that operations (job setting information) are combined.

[7] The job processing system of any one of Items. 1 to 5, wherein, in combining the first job setting information acquired from the one terminal and saved in the saving unit with setting information about a job corresponding to a job setting operation accepted from a user by another terminal using the other method, if there is an inconsistency in the setting information, the processor preferably eliminates the inconsistency in compliance with a predetermined rule, and combines the first job setting information acquired from the one terminal and saved in the saving unit with the setting information about the job corresponding to the job setting operation accepted by the another terminal using the other method from a user.

In the above embodiment of the present invention or the embodiment described below in Item. 16 or 25, if there is an inconsistency between the setting information about a job for which part of an operation has been performed by one terminal and the setting information about the job taken over by another terminal, the inconsistency is eliminated before the job setting information is combined.

[8] The job processing system of any one of Items. 1 to 5 and 7, wherein when a failure hindering a continuance of the first job setting operation is detected while the one terminal is accepting the first job setting operation, the one terminal using the second method preferably creates first job setting information corresponding to job setting operations accepted so far, and transmits the first job setting information to the job processing apparatus, and when the first job setting operation is determined to be taken over by another terminal using the first method, the job processing apparatus preferably creates an operation screen reflecting the first job setting information received from the one terminal using the second method and saved in the saving unit, and transmits the operation screen to another terminal using the first method, and the another terminal accepts the rest of the first job setting operation.

In the above embodiment of the present invention or the embodiment described below in Item. 17 or 26, when a failure hindering a continuance of an operation in a terminal using the second method is detected, the terminal using the second method creates setting information corresponding to the contents of the operations accepted so far, and transmits the setting information to the job processing apparatus. In accordance with the setting information received from the second terminal, the job processing apparatus creates an operation screen that reflects the contents of the operations accepted by the second terminal so far, and the terminal using the first method accepts the rest of the operation with the operation screen serving as the initial screen.

[9] The job processing system of any one of Items. 1 to 8, wherein the saving unit preferably associates job setting information acquired from one terminal with identification information about the one terminal or a user of the one terminal before saving the job setting information, and setting information to be taken over is preferably selected from the setting information saved for respective pieces of the identification information in the saving unit.

In the above embodiment of the present invention or the embodiment described below in Item. 18 or 27, operation take-overs are managed on a user-by-user basis or on a terminal-by-terminal basis.

[10] To achieve the abovementioned object, according to an aspect, a job processing apparatus that receives a job input from a terminal and executes the job, reflecting one aspect of the present invention comprises:

a processor configured to have: a function of acquiring setting information indicating setting contents of a job for which a terminal has received a setting operation from a user by a first method, the first method being designed for: transmitting data of an operation screen to a terminal and causing the terminal to display the operation screen; receiving, from the terminal, location information indicating a location of an operation received from a user through the operation screen, the location being on the operation screen; and recognizing contents of the operation received by the terminal from the user, in accordance with the received location information and information about the operation screen; and a function of acquiring setting information indicating setting contents of a job for which a terminal has received a setting operation from a user by a second method, the second method being different from the first method; and a saving unit configured to save job setting information acquired from a terminal by the processor, wherein the processor is configured to:

determine whether a first job setting operation being accepted by one terminal using one of the first method and the second method is to be taken over by another terminal using the other one of the first method and the second method; and combine first job setting information acquired from the one terminal and saved in the saving unit, with setting information about a job corresponding to a job setting operation received from a user by another terminal using the other method, when the processor determines that the first job input operation being accepted by the one terminal is to be taken over by another terminal using the other method, and wherein an input of the first job is accepted in accordance with the setting information combined by the combining unit.

[11] The job processing apparatus of Item. 10, wherein the second method is preferably a method by which a terminal recognizes setting contents of a job corresponding to a job setting operation accepted from a user, and the terminal preferably transmits setting information indicating the recognized setting contents of the job to the job processing apparatus.

[12] The job processing apparatus of Item. 10 or 11, wherein, when receiving a predetermined switch instruction from a user, the processor preferably determines that the first job setting operation being accepted by the one terminal is to be taken over by another terminal using the other method.

[13] The job processing apparatus of Item. 10 or 11, wherein, when receiving setting information about the same job as the first job from the another terminal, the processor preferably determines that the first job setting operation being accepted by the one terminal is to be taken over by the another terminal.

[14] The job processing apparatus of Item. 10 or 11, wherein, when the same user as the user performing the first job setting operation on the one terminal performs a job setting operation on the another terminal, the processor preferably determines that the first job setting operation being accepted by the one terminal is to be taken over by the another terminal.

[15] The job processing apparatus of any one of Items. 10 to 14, wherein when the one terminal uses the first method, the processor preferably converts the first job setting information saved in the saving unit into data in a predetermined format recognizable to the another terminal using the second method, and transmits the data and a combining instruction to the another terminal, and the job processing apparatus preferably receives first job setting information reflecting all setting operations from the another terminal, and accepts the first job input in accordance with the setting information, the another terminal receiving the data and the combining instruction, the another terminal creating and displaying an operation screen reflecting the setting information indicated by the data, the another terminal accepting the rest of the first job setting operation from the user, the another terminal creating and transmitting the first job setting information reflecting all the setting operations when the first job setting operation is completed.

[16] The job processing apparatus of any one of Items. 10 to 15, wherein, in combining the first job setting information acquired from the one terminal and saved in the saving unit with setting information about a job corresponding to a job setting operation accepted from a user by another terminal using the other method, if there is an inconsistency in the setting information, the processor preferably eliminates the inconsistency in compliance with a predetermined rule, and combines the first job setting information acquired from the one terminal and saved in the saving unit with the setting information about the job corresponding to the job setting operation accepted by the another terminal using the other method from the user.

[17] The job processing apparatus of any one of Items. 10 to 14 and 16, wherein when a failure hindering a continuance of the first job setting operation is detected while the one terminal is accepting the first job setting operation, the one terminal using the second method preferably creates first job setting information corresponding to job setting operations accepted so far, and transmits the first job setting information to the job processing apparatus, and, when the processor determines that the first job setting operation is to be taken over by another terminal using the first method, an operation screen reflecting the first job setting information received from the one terminal using the second method and saved in the saving unit is preferably created and is transmitted to the another terminal using the first method, and the another terminal accepts the rest of the first job setting operation.

[18] The job processing apparatus of any one of Items. 10 to 17, wherein the saving unit preferably associates job setting information acquired from one terminal with identification information about the one terminal or a user of the one terminal before saving the job setting information, and setting information to be taken over is preferably selected from the setting information saved for respective pieces of the identification information in the saving unit.

[19] To achieve the abovementioned object, according to an aspect, there is provided a non-transitory recording medium storing a computer readable program to be executed in a job processing apparatus that receives a job input from a terminal and executes the job, and the program reflecting one aspect of the present invention comprises:

a remote operation accepting step of performing: a process of acquiring setting information indicating setting contents of a job for which a terminal has received a setting operation from a user by a first method, the first method being designed for: transmitting data of an operation screen to a terminal and causing the terminal to display the operation screen; receiving, from the terminal, location information indicating a location of an operation received from a user through the operation screen, the location being on the operation screen; and recognizing contents of the operation received by the terminal from the user, in accordance with the received location information and information about the operation screen; and a process of acquiring setting information indicating setting contents of a job for which a terminal has received a setting operation from a user by a second method, the second method being different from the first method;

a saving step of saving, into a saving unit, job setting information acquired from a terminal in the remote operation accepting step;

a take-over determining step of determining whether a first job setting operation being accepted by one terminal using one of the first method and the second method is to be taken over by another terminal using the other one of the first method and the second method;

a combining step of combining first job setting information acquired from the one terminal and saved in the saving unit, with setting information about a job corresponding to a job setting operation received from a user by another terminal using the other method, when the first job input operation being accepted by the one terminal is determined to be taken over by another terminal using the other method in the take-over determining step; and a step of accepting an input of the first job in accordance with the setting information combined in the combining step.

[20] The non-transitory recording medium storing a computer readable program of Item. 19, wherein the second method is preferably a method by which a terminal recognizes setting contents of a job corresponding to a job setting operation accepted from a user, and the terminal preferably transmits setting information indicating the recognized setting contents of the job to the job processing apparatus.

[21] The non-transitory recording medium storing a computer readable program of Item. 19 or 20, wherein, when a predetermined switch instruction is received from a user, the first job setting operation being accepted by the one terminal is preferably determined to be taken over by another terminal using the other method in the take-over determining step.

[22] The non-transitory recording medium storing a computer readable program of Item. 19 or 20, wherein, when setting information about the same job as the first job is received from the another terminal, the first job setting operation being accepted by the one terminal is preferably determined to be taken over by the another terminal in the take-over determining step.

[23] The non-transitory recording medium storing a computer readable program of Item. 19 or 20, wherein, when the same user as the user performing the first job setting operation on the one terminal performs a job setting operation on the another terminal, the first job setting operation being accepted by the one terminal is preferably determined to be taken over by the another terminal in the take-over determining step.

[24] The non-transitory recording medium storing a computer readable program of any one of Items. 19 to 23, wherein when the one terminal uses the first method, the first job setting information saved in the saving unit is preferably converted into data in a predetermined format recognizable to the another terminal using the second method, and the data and a combining instruction are preferably transmitted to the another terminal in the combining step, and first job setting information reflecting all setting operations is preferably received from the another terminal, and an input of the first job is accepted in accordance with the setting information, the another terminal receiving the data and the combining instruction, the another terminal creating and displaying an operation screen reflecting the setting information indicated by the data, the another terminal accepting the rest of the first job setting operation from the user, the another terminal creating and transmitting the first job setting information reflecting all the setting operations when the first job setting operation is completed.

[25] The non-transitory recording medium storing a computer readable program of any one of Items. 19 to 24, wherein, in combining the first job setting information acquired from the one terminal and saved in the saving unit with setting information about a job corresponding to a job setting operation accepted from a user by another terminal using the other method in the combining step, if there is an inconsistency in the setting information, the inconsistency is preferably eliminated in compliance with a predetermined rule, and the first job setting information acquired from the one terminal and saved in the saving unit is preferably combined with the setting information about the job corresponding to the job setting operation accepted by the another terminal using the other method from a user.

[26] The non-transitory recording medium storing a computer readable program of any one of Items. 19 to 23 and 25, wherein when a failure hindering a continuance of the first job setting operation is detected while the one terminal is accepting the first job setting operation, the one terminal using the second method preferably creates first job setting information corresponding to job setting operations accepted so far, and transmits the first job setting information to the job processing apparatus, and, when the first job setting operation is determined to be taken over by another terminal using the first method in the take-over determining step, an operation screen reflecting the first job setting information received from the one terminal using the second method and saved in the saving unit is preferably created and is preferably transmitted to the another terminal using the first method in the combining step, and the another terminal preferably accepts the rest of the first job setting operation.

[27] The non-transitory recording medium storing a computer readable program of any one of Items. 19 to 26, wherein in the saving step, job setting information acquired from one terminal is preferably associated with identification information about the one terminal or a user of the one terminal, and is preferably saved into the saving unit, and the program preferably further comprises a step of selecting setting information to be taken over from the setting information saved for respective pieces of the identification information in the saving unit.

[28] To achieve the abovementioned object, according to an aspect, a method implemented in a job processing apparatus that receives a job input from a terminal and executes the job, reflecting one aspect of the present invention comprises:

a remote operation accepting step of performing: a process of acquiring setting information indicating setting contents of a job for which a terminal has received a setting operation from a user by a first method, the first method being designed for: transmitting data of an operation screen to a terminal and causing the terminal to display the operation screen; receiving, from the terminal, location information indicating a location of an operation received from a user through the operation screen, the location being on the operation screen; and recognizing contents of the operation received by the terminal from the user, in accordance with the received location information and information about the operation screen; and a process of acquiring setting information indicating setting contents of a job for which a terminal has received a setting operation from a user by a second method, the second method being different from the first method;

a saving step of saving, into a saving unit, job setting information acquired from a terminal in the remote operation accepting step;

a take-over determining step of determining whether a first job setting operation being accepted by one terminal using one of the first method and the second method is to be taken over by another terminal using the other one of the first method and the second method;

a combining step of combining first job setting information acquired from the one terminal and saved in the saving unit, with setting information about a job corresponding to a job setting operation received from a user by another terminal using the other method, when the first job input operation being accepted by the one terminal is determined to be taken over by another terminal using the other method in the take-over determining step; and a step of accepting an input of the first job in accordance with the setting information combined in the combining step.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

Figure 1:
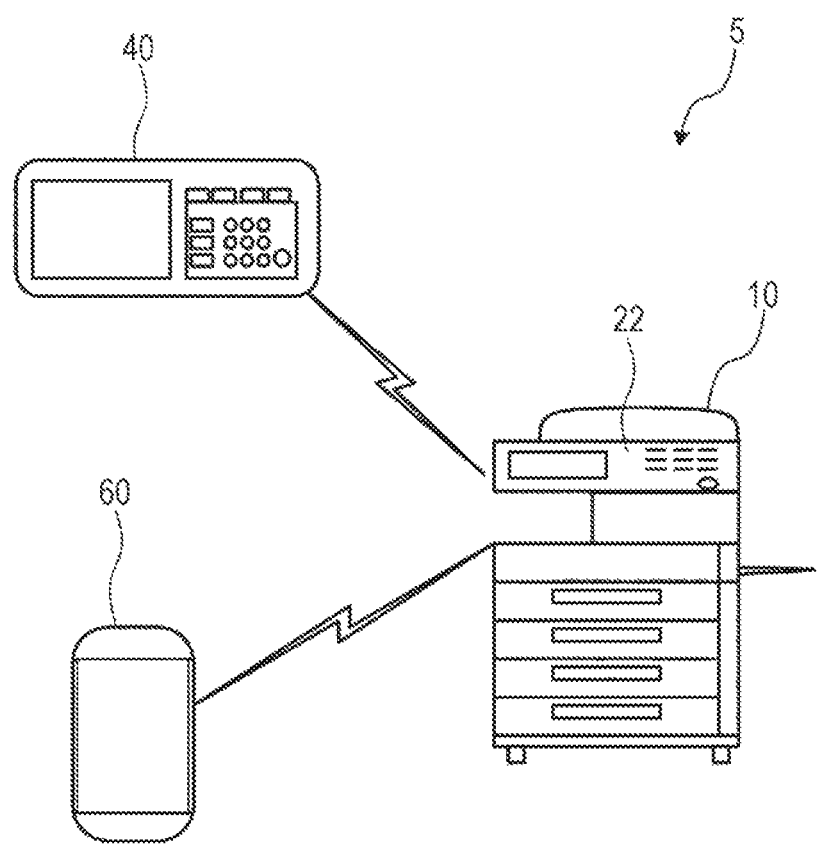
FIG. 1 is a diagram showing an example configuration of a job processing system according to an embodiment of the present invention.

FIG. 1 shows an example configuration of a job processing system 5 according to an embodiment of the present invention. The job processing system 5 includes a job processing apparatus 10, and terminals (a remote operation panel 40 and a mobile terminal 60 in FIG. 1) that accepts operations to set jobs to be input to the job processing apparatus 10.

The job processing apparatus 10 is so-called multifunction peripherals (also written as MFP) that have functions of executing different kinds of jobs, such as a copy job to optically read a document and print a duplicate image thereof onto a recording paper sheet, a scan job to store image data of a read document as a file or transmit the image data to an external terminal via a network, and a print job to form an image according to print data received from a terminal device via a network onto a recording paper sheet and print out the image.

In the job processing system 5, a job input operation and various kinds of setting operations from users can be accepted through an operation panel 22 of the job processing apparatus 10, and various operations related to job setting and inputs from users can also be accepted through the remote operation panel 40 and the mobile terminal 60 independent of the job processing apparatus 10, and be input to the job processing apparatus 10.

Methods of inputting a job to the job processing apparatus 10 from a terminal include the first method and the second method explained in the Description of the Related Art. In this example, the remote operation panel 40 uses the first method, and the mobile terminal 60 uses the second method.

In a case where a job input operation is to be accepted from the remote operation panel 40 using the first method, the data of an operation screen is transmitted from the job processing apparatus 10 to the remote operation panel 40. Receiving the data of the operation screen, the remote operation panel 40 displays the operation screen. Upon receipt of an operation from a user through the operation screen, the remote operation panel 40 transmits location information indicating the location on the operation screen at which the operation has been accepted, to the job processing apparatus 10. The job processing apparatus 10 that has received the location information recognizes the contents of the operation accepted from the user, in accordance with the information about the operation screen transmitted to the remote operation panel 40 and the location information received from the remote operation panel 40. The job processing apparatus 10 generates job setting information in accordance with the recognized contents of the operation, and then accepts the job input.

An application program for causing the mobile terminal 60 as the operation panel of the job processing apparatus 10 (this application is called the operation panel application) is installed in the mobile terminal 60 using the second method. By executing this operation panel application, the mobile terminal 60 functions in the same manner as the operation panel 22 of the job processing apparatus 10. Specifically, the mobile terminal 60 displays an operation screen generated by the operation panel application. Upon receipt of an operation from a user through the operation screen, the mobile terminal 60 creates setting information about the corresponding job, and transmits the setting information to the job processing apparatus 10. When a job input operation is completed (such as when a start button pressing operation is received), the job setting information that reflects the contents of all the operations accepted so far is created, and is transmitted to the job processing apparatus 10. The job processing apparatus 10 accepts the job input through the job setting information received from the mobile terminal 60.

The job processing system 5 also has an operation takeover function. With this function, the mobile terminal 60 using the second method takes over a job input operation being accepted by the remote operation panel 40 using the first method, and accepts the rest of the operation. The remote operation panel 40 using the first method takes over a job input operation being accepted by the mobile terminal 60 using the second method, and accepts the rest of the operation.

For example, in a case where a communication failure occurs while a job input operation from the remote operation panel 40 being accepted, the mobile terminal 60 inherits the contents of the operation performed so far. By doing so, the mobile terminal 60 can accept the rest of the operation, to complete the job input operation.

Figure 2:
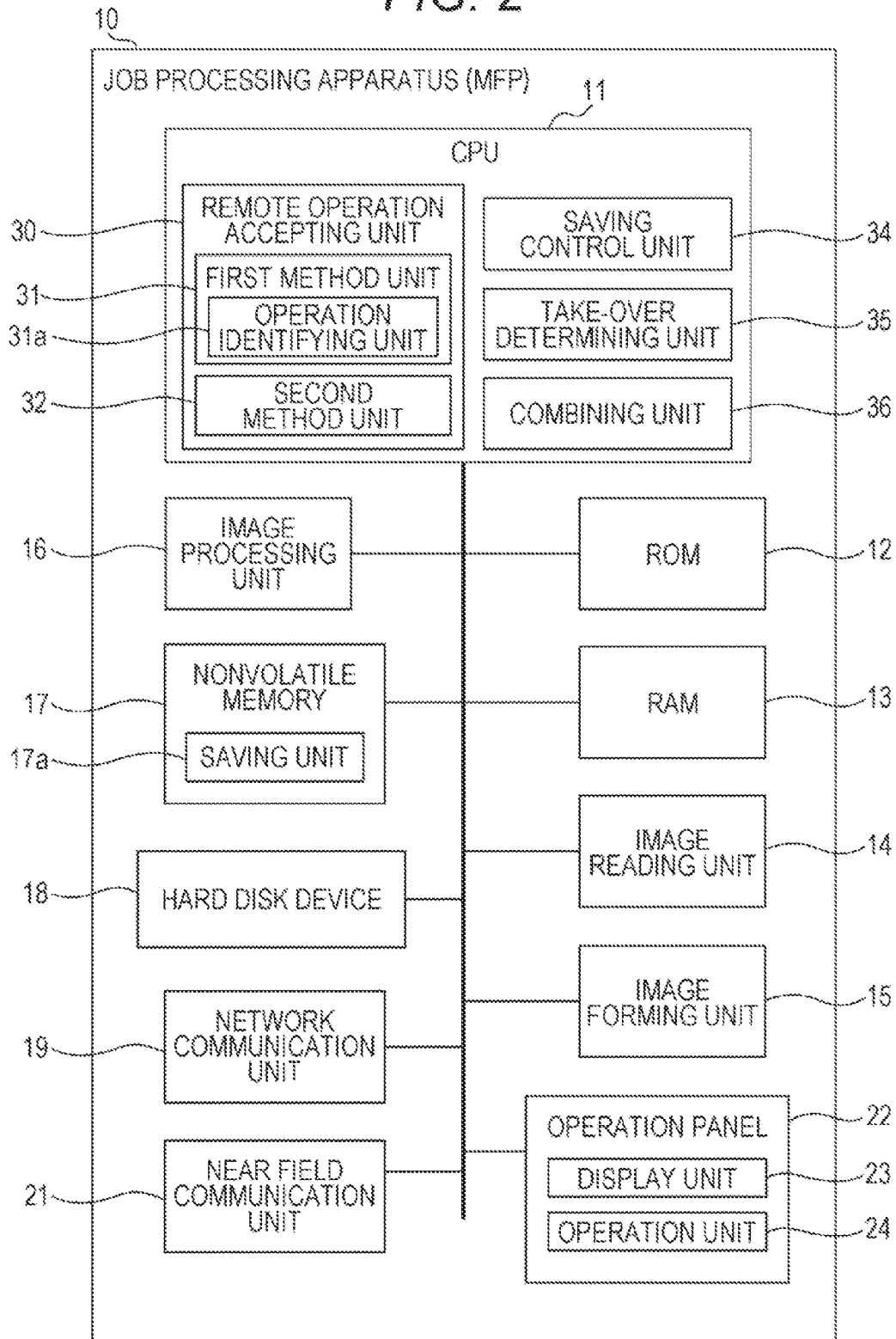
FIG. 2 is a block diagram schematically showing the configuration of a job processing apparatus (MFP)

FIG. 2 is a block diagram schematically showing the configuration of the job processing apparatus (MFP) 10. The job processing apparatus 10 includes a central processing unit (CPU) 11 that collectively controls operation of the job processing apparatus 10. A read only memory (ROM) 12, a random access memory (RAM) 13, an image reading unit 14, an image forming unit 15, an image processing unit 16, a nonvolatile memory 17, a hard disk device 18, a network communication unit 19, a near field communication unit 21, and the operation panel 22 are connected to the CPU 11 via a bus.

The CPU 11 operates based on an operating system (OS) program, and executes middleware, application programs, and the like. Various kinds of programs are stored in the ROM 12, and the CPU 11 performs various kinds of processes in accordance with these programs to achieve the respective functions of the job processing apparatus 10.

The RAM 13 is used as a work memory for temporarily storing various kinds of data when the CPU 11 performs a process in accordance with a program, and as an image memory for storing image data.

The image reading unit 14 functions to acquire image data by optically reading a document. The image reading unit 14 includes: a light source that emits light onto a document; a line image sensor that receives the light reflected from the document and reads one line of the document in the width direction; a moving unit that sequentially moves the line-based read position in the longitudinal direction of the document; an optical path formed with a lens or a mirror that guides the light reflected from the document toward the line image sensor to form an image; and a converting unit that converts the analog image signal output from the line image sensor into digital image data.

The image forming unit 15 functions to form an image on a recording paper sheet in accordance with image data. In this example, the image forming unit 15 is formed as a laser printer that includes a recording sheet conveyance device, a photosensitive drum, a charging device, a laser unit, a development device, a transfer/separation device, a cleaning device, and a fixing device. The laser printer performs image formation through an electrophotographic process. Image formation may be performed by some other method.

The image processing unit 16 performs a rasterization process to convert a file (print data) included in a print job into image data, an image data compression/expansion process, and the like, as well as processes such as image enlargement/reduction and image rotation.

The nonvolatile memory 17 is a memory (a flash memory) in which stored contents are not destroyed even when the power supply is turned off. The nonvolatile memory 17 functions as a saving unit 17a that temporarily saves job setting information obtained from the remote operation panel 40 or the mobile terminal 60, to take over an operation.

The hard disk device 18 is a nonvolatile, large-capacity storage device, and stores various kinds of programs, received print jobs, and the like.

The network communication unit 19 functions to communicate with other devices via a network.

The near field communication unit 21 functions to perform wireless communication with the remote operation panel 40, the mobile terminal 60, or the like by a communication method such as WiFi-Direct or Bluetooth (a registered trade name).

The operation panel 22 includes a display unit 23 and an operation unit 24. The display unit 23 is formed with a liquid crystal display (LCD) or the like, and functions to display various kinds of operation screens, setting screens, and the like. The operation unit 24 includes hard keys such as numeric keys and a start button, and a touch panel disposed on the physical screen of the display unit 23. The touch panel detects the coordinates of a location at which the physical screen of the display unit 23 is touched with a stylus pen or a finger.

The CPU 11 of the job processing apparatus 10 functions to take over an operation as described above by executing a program. Specifically, the CPU 11 functions as a remote operation accepting unit 30, a saving control unit 34, a take-over determining unit 35, a combining unit 36, and the like.

The remote operation accepting unit 30 functions to accept a job input from a terminal such as the remote operation panel 40 or the mobile terminal 60. The remote operation accepting unit 30 functions as a first method unit 31 and a second method unit 32. The first method unit 31 functions to acquire setting information indicating the contents of a job setting operation the remote operation panel 40 has accepted from a user, by the first method. The second method unit 32 functions to acquire setting information indicating the setting contents of a job for which the mobile terminal 60 has accepted a setting operation from a user, by the second method. The first method unit 31 functions as an operation identifying unit 31a that recognizes (identifies) the contents of an operation the remote operation panel 40 has accepted from a user, in accordance with location information received from the remote operation panel 40 and operation screen information transmitted to the remote operation panel 40.

The saving control unit 34 controls an operation to save, into the saving unit 17a, setting information about a job (or the contents of an operation) acquired by the remote operation accepting unit 30 from the remote operation panel 40 or the mobile terminal 60.

The take-over determining unit 35 determines whether a job setting operation being accepted by one terminal using one of the first and second methods is to be taken over by another terminal using the other one of the first and second methods.

In a case where the take-over determining unit 35 determines that a job input operation being accepted by one terminal is to be taken over by another terminal using the other method, the combining unit 36 functions to combine the job setting information that has been obtained from the one terminal and is saved in the saving unit 17a with the job setting information corresponding to the job setting operation accepted by the other terminal using the other method from a user.

In accordance with the setting information combined by the combining unit 36, the job processing apparatus 10 accepts a job input.

Figure 3:
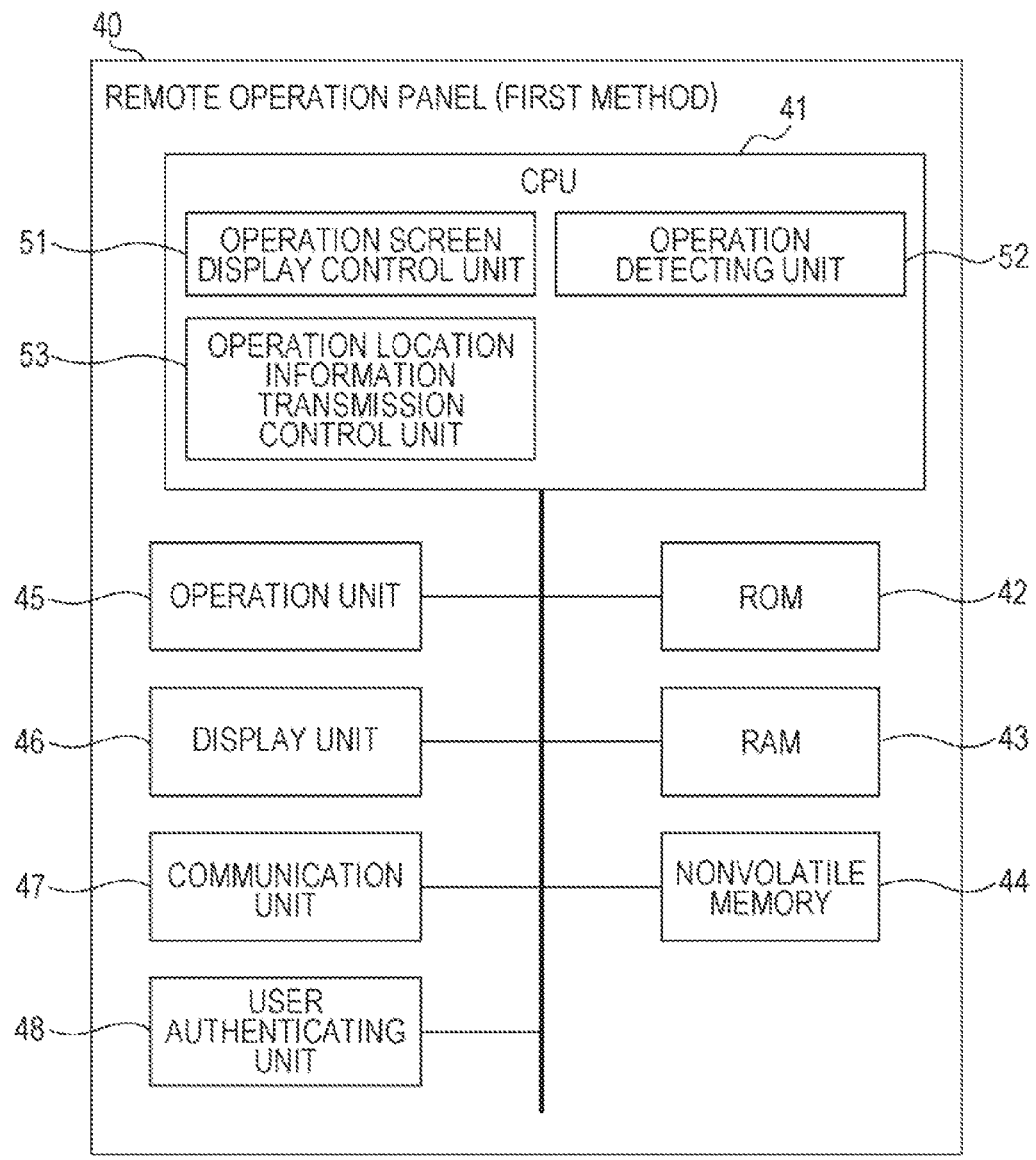
FIG. 3 is a block diagram schematically showing the configuration of a remote operation panel.

FIG. 3 is a block diagram schematically showing the configuration of the remote operation panel 40. The remote operation panel 40 includes a CPU 41 that collectively controls operation of the remote operation panel 40. A ROM 42, a RAM 43, a nonvolatile memory 44, an operation unit 45, a display unit 46, a communication unit 47, a user authenticating unit 48, and the like are connected to the CPU 41 via a bus.

A program is stored in the ROM 42, and the CPU 41 performs processes in accordance with the program to achieve the functions of the remote operation panel 40.

The RAM 43 is used as a work memory in which various kinds of data are temporarily stored when the CPU 41 performs a process in accordance with the program.

The nonvolatile memory 44 is a memory (a flash memory) in which stored contents are not destroyed even when the power supply is turned off, and stores various kinds of fixed data, terminal setting information, and the like.

The display unit 46 is formed with a liquid crystal display or the like, and displays an operation screen or the like corresponding to the data of an operation screen received from the job processing apparatus 10. The operation unit 45 includes hard keys such as numeric keys and a start button, and a touch panel disposed on the physical screen of the display unit 46. By virtue of the function of the touch panel, the location at which a user has touched the screen on the display unit 46 is detected, and information about the location (such as coordinate information, with the base point being a specific location on the screen) is acquired.

The communication unit 47 functions to communicate with the job processing apparatus 10 and other external devices via a network or near field communication.

The user authenticating unit 48 authenticates the user to use the remote operation panel 40. The user may be authenticated by any appropriate method, such as ID card recognition or matching between a password and an ID that have been input.

The CPU 41 of the remote operation panel 40 executes a program, to function as a terminal compliant with the first method. Specifically, the CPU 41 functions as an operation screen display control unit 51, an operation detecting unit 52, an operation location information transmission control unit 53, and the like.

The operation screen display control unit 51 performs control so that the operation screen corresponding to the data of an operation screen received from the job processing apparatus 10 is displayed on the display unit 46. The operation detecting unit 52 detects the location (location information) of an operation performed by a user on the operation screen being displayed on the display unit 46. The operation location information transmission control unit 53 performs control so that the location information detected by the operation detecting unit 52 is sequentially transmitted to the job processing apparatus 10.

When a hard key such as a numeric key is operated, the remote operation panel 40 transmits information about the operated key to the job processing apparatus 10.

Figure 4:
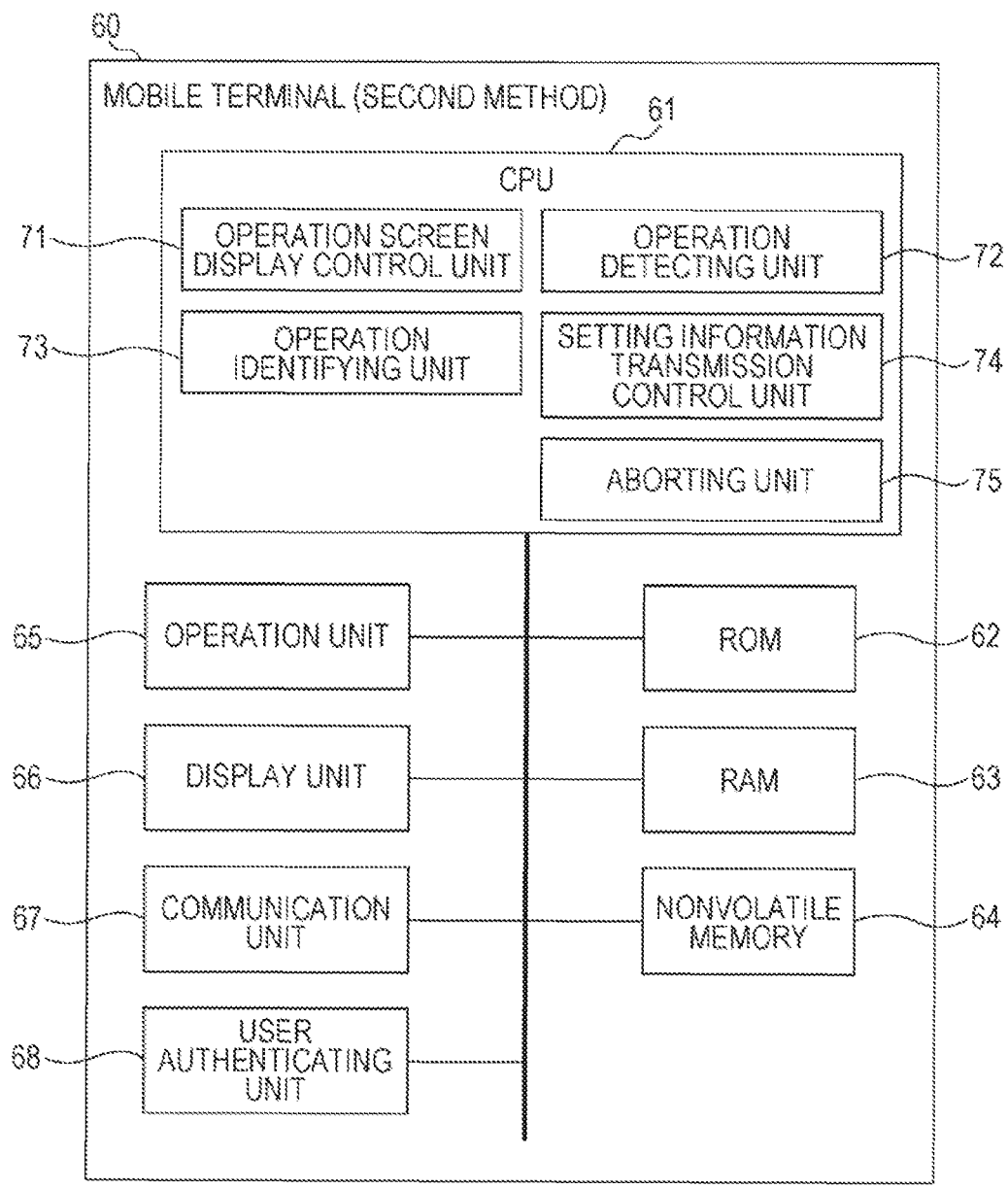
FIG. 4 is a block diagram schematically showing the configuration of a mobile terminal.

FIG. 4 is a block diagram schematically showing the configuration of the mobile terminal 60. The mobile terminal 60 includes a CPU 61 that collectively controls operation of the mobile terminal 60. A ROM 62, a RAM 63, a nonvolatile memory 64, an operation unit 65, a display unit 66, a communication unit 67, a user authenticating unit 68, and the like are connected to the CPU 61 via a bus.

The CPU 61 controls operation of the mobile terminal 60 in accordance with a program stored in the ROM 62 or the nonvolatile memory 64, or the above described operation panel application. The RAM 63 is used as a work memory or the like in which various kinds of data are temporarily stored when the CPU 61 executes a program. The nonvolatile memory 64 is a memory (a flash memory) in which stored contents are not destroyed even when the power supply is turned off, and stores various kinds of setting information, the operation panel application, and the like.

The display unit 66 is formed with a liquid crystal display or the like. An operation screen or the like generated by the operation panel application is displayed on the display unit 66. The operation unit 65 includes a small number of hard keys, and a touch panel disposed on the physical screen of the display unit 66.

The communication unit 67 functions to communicate with the job processing apparatus 10 and other external devices via a network or near field communication.

The user authenticating unit 68 authenticates the user to use the mobile terminal 60. The user may be authenticated by any appropriate method, such as fingerprint authentication or matching between a password and an ID that have been input.

The CPU 61 executes the operation panel application, to function as an operation screen display control unit 71, an operation detecting unit 72, an operation identifying unit 73, a setting information transmission control unit 74, an aborting unit 75, and the like.

The operation screen display control unit 71 controls display of various operation screens for inputting jobs to the job processing apparatus 10, changes in the contents of display, screen transitions, and the like. The operation detecting unit 72 detects the location (location information) of an operation performed by a user on the operation screen being displayed on the display unit 66.

From the operation screen being displayed and location information detected by the operation detecting unit 72, the operation identifying unit 73 recognizes (identifies) the contents of an operation accepted from a user through the operation screen. The setting information transmission control unit 74 performs control so that job setting information is generated in accordance with the operation contents recognized by the operation detecting unit 72, and is then transmitted to the job processing apparatus 10.

When a failure (a dead battery, for example) that hinders a continuation of acceptance of an operation is detected, the aborting unit 75 aborts the operation, and performs control so that the operation is taken over by another terminal. In this case, when a failure is detected, setting information corresponding to the contents of the operations accepted so far is created, and is transmitted together with a take-over instruction to the job processing apparatus 10, so that the job processing apparatus 10 takes over the operation using another terminal.

Next, an example where a job is input from the remote operation panel 40 to the job processing apparatus 10 is described.

Figure 5:
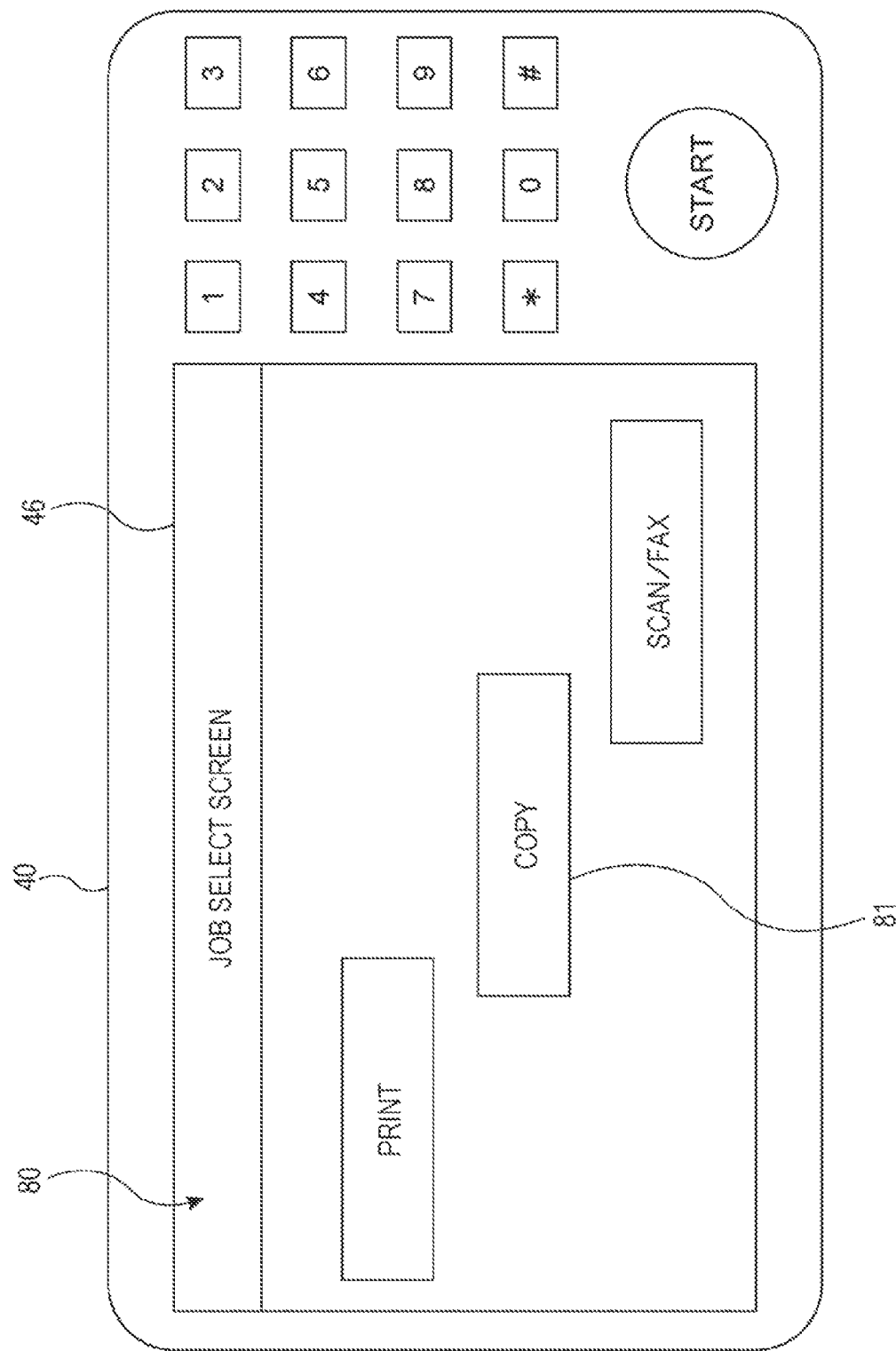
FIG. 5 is a diagram showing the remote operation panel displaying a job select screen.

To accept a job setting or input operation from the remote operation panel 40, the job processing apparatus 10 first transmits the data of an operation screen to receive job selection to the remote operation panel 40, and causes the remote operation panel 40 to display the job select screen 80 shown in FIG. 5. Select buttons for selecting job types, such as copy, print, and scan/FAX, are arranged on the job select screen 80. On the job select screen 80, a user selects the type of the job to be input. In this example, a copy select button 81 is operated.

Upon receipt of a select operation, the remote operation panel 40 generates location information indicating the location of the operation on the screen (the job select screen 80) of the display unit 46, and transmits the location information to the job processing apparatus 10. In accordance with layout information about the respective select buttons on the job select screen 80 and the location information received from the remote operation panel 40, the job processing apparatus 10 recognizes that the copy select button 81 has been operated, and sets "copy" in the job type setting item in the job setting information. The data of the operation screen (the basic setting screen 83 shown in FIG. 6) for receiving specific settings related to copying is then transmitted to the remote operation panel 40.

Figure 6:
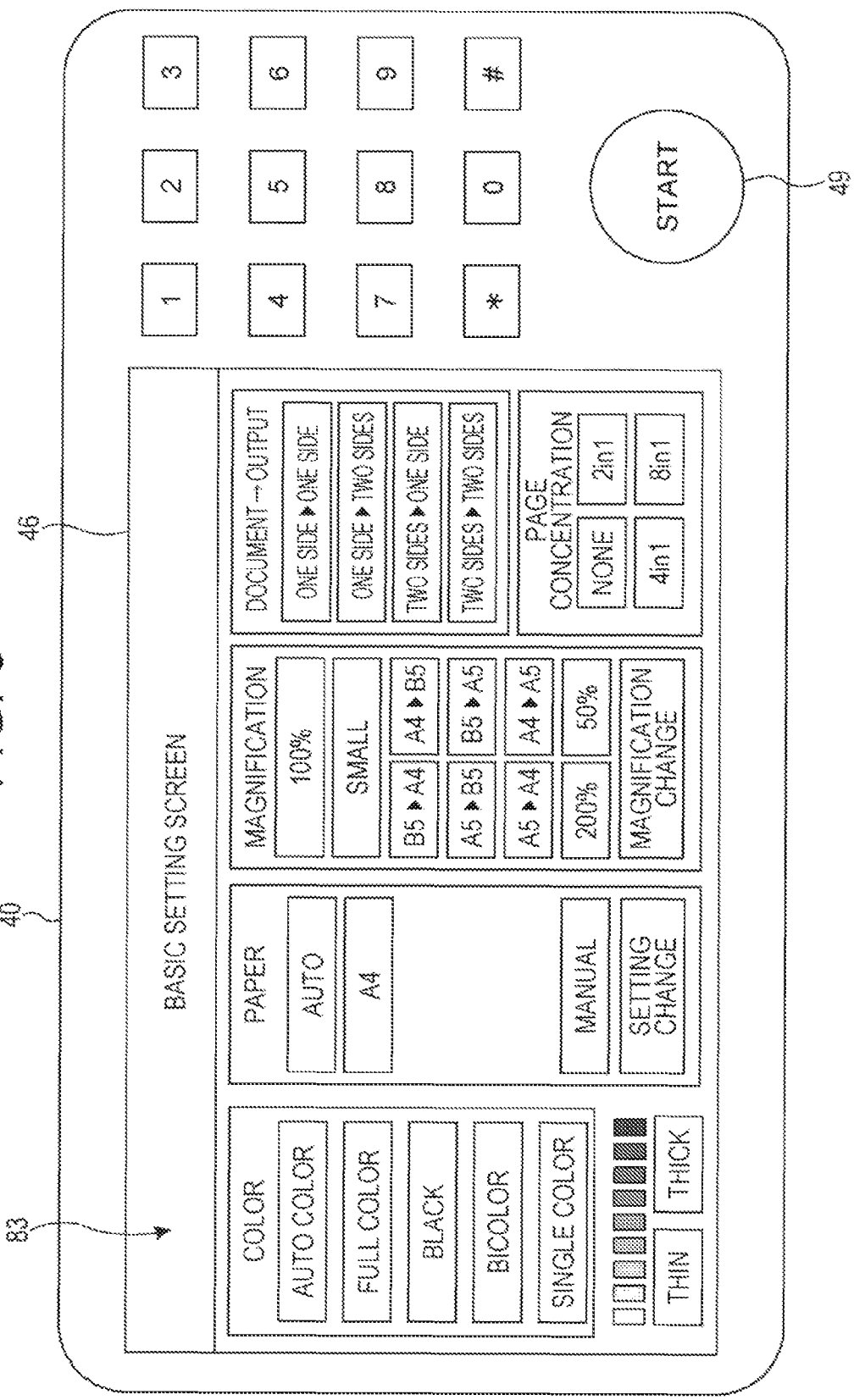
FIG. 6 is a diagram showing the remote operation panel displaying a basic setting screen.

In accordance with the data of the operation screen received from the job processing apparatus 10, the remote operation panel 40 displays the basic setting screen 83. FIG. 6 shows the remote operation panel 40 on which the basic setting screen 83 is displayed.

Upon receipt of an operation through the basic setting screen 83, location information indicating the location of the operation on the screen (the basic setting screen 83) of the display unit 46 is transmitted from the remote operation panel 40 to the job processing apparatus 10. In accordance with the operation screen being displayed and the location information received from the remote operation panel 40, the job processing apparatus 10 recognizes the contents of the operation, and creates setting information about the corresponding setting.

Figure 7:
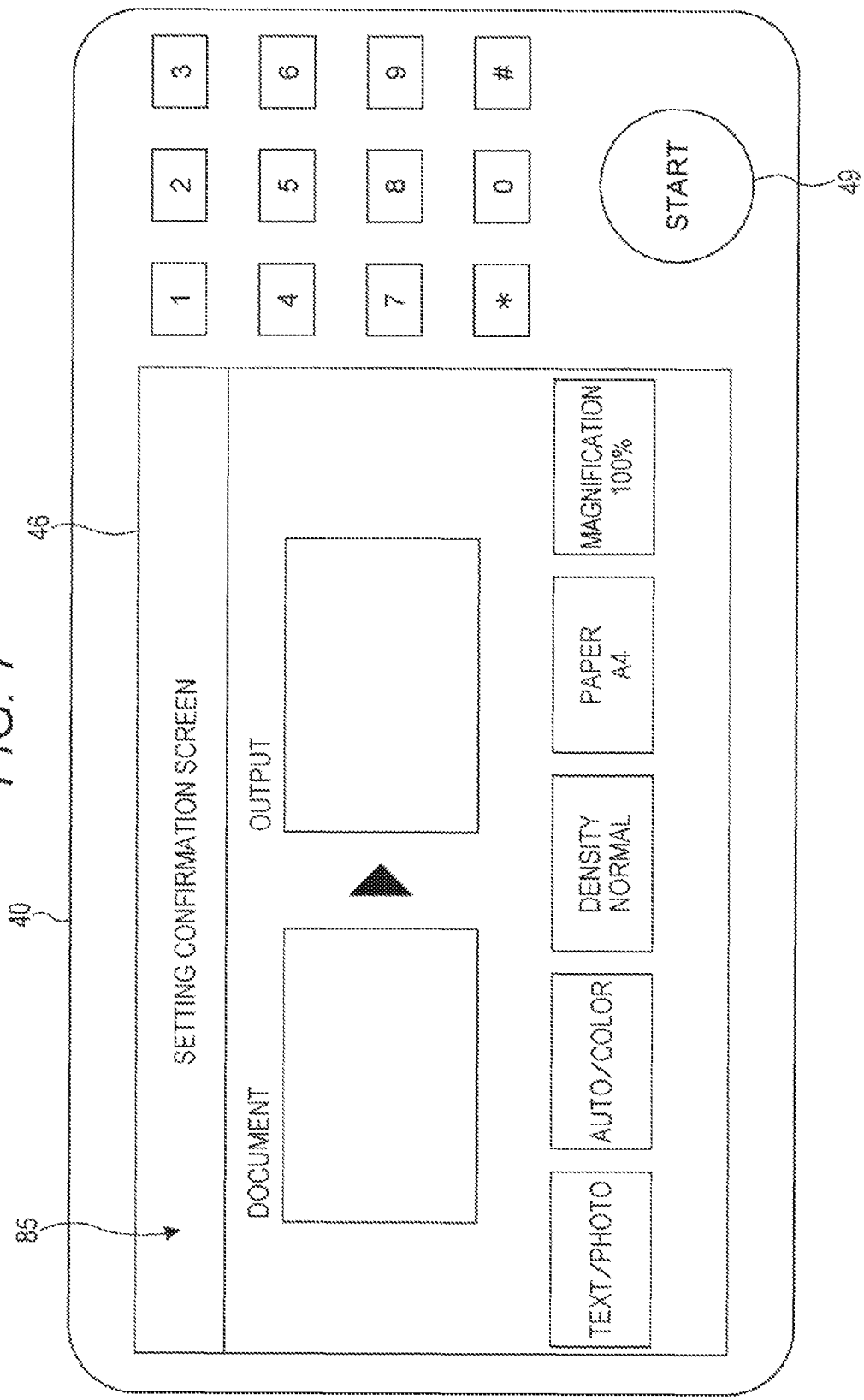
FIG. 7 is a diagram showing the remote operation panel displaying a setting confirmation screen.

When the setting related to the job input is completed, the job processing apparatus 10 transmits the data of the setting confirmation screen 85 shown in FIG. 7 to the remote operation panel 40, and causes the remote operation panel 40 to display the setting confirmation screen 85. The user looks at the setting confirmation screen 85 displayed on the display unit 46 of the remote operation panel 40, and checks the contents of the job settings. If the contents are correct, the user presses a job execution start button, such as a start button 49 that is a hard key. The remote operation panel 40 transmits information indicating the pressing of the start button 49 to the job processing apparatus 10. Receiving the information, the job processing apparatus 10 accepts an input of the job with the contents of the setting information created so far.

Next, a case where a job input operation being performed by the remote operation panel 40 is taken over by the mobile terminal 60 is described.

Figure 8:
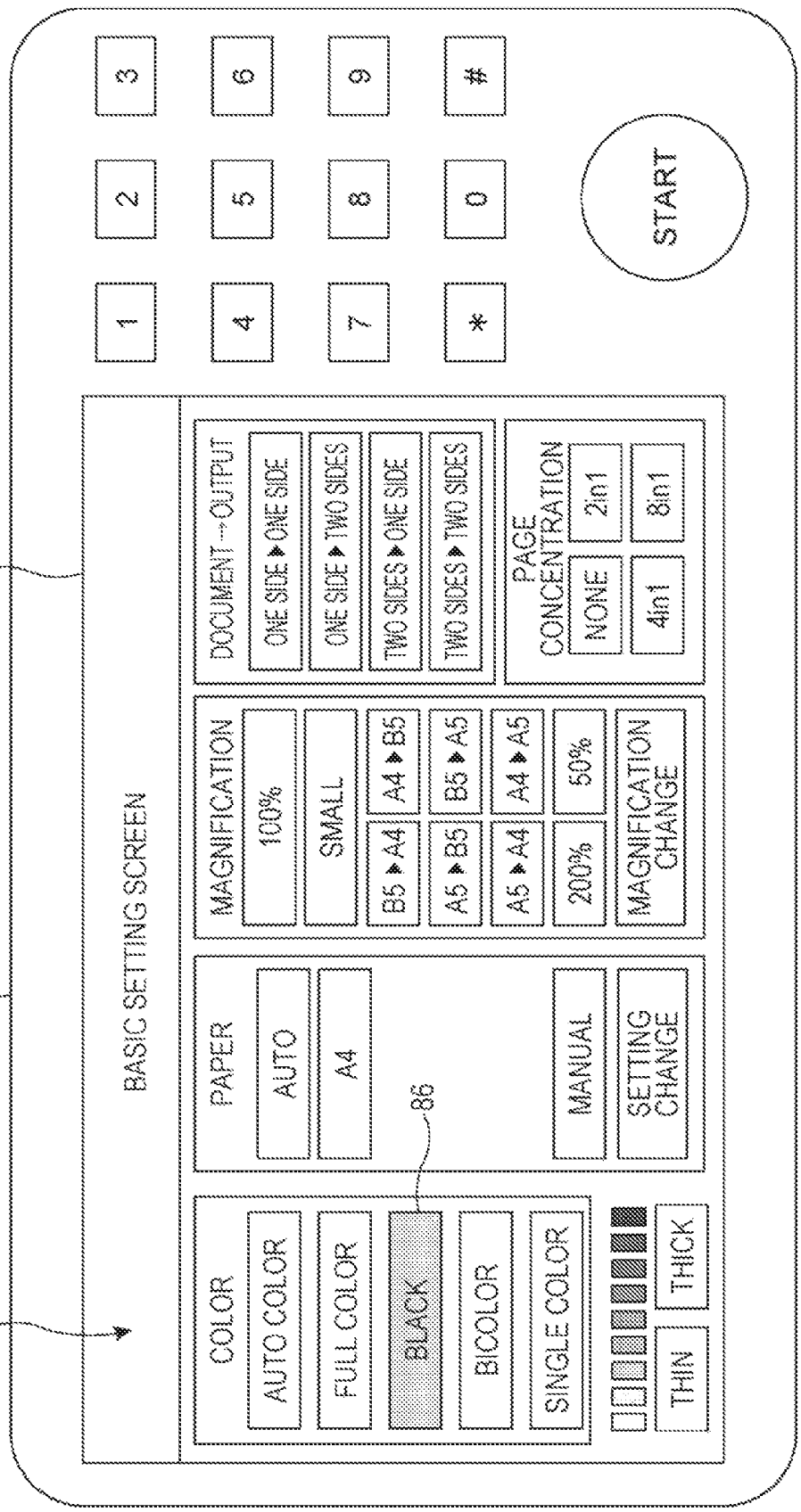
FIG. 8 is a diagram showing the remote operation panel displaying the basic setting screen on which "black" is selected as a color setting during a setting operation.

In this example, a copy job is selected on the remote operation panel 40, and the display is further switched to the basic setting screen 83 as shown in FIG. 8. On the basic setting screen 83, a "black" select button 86 for a color setting is operated by the user.

Figure 9:
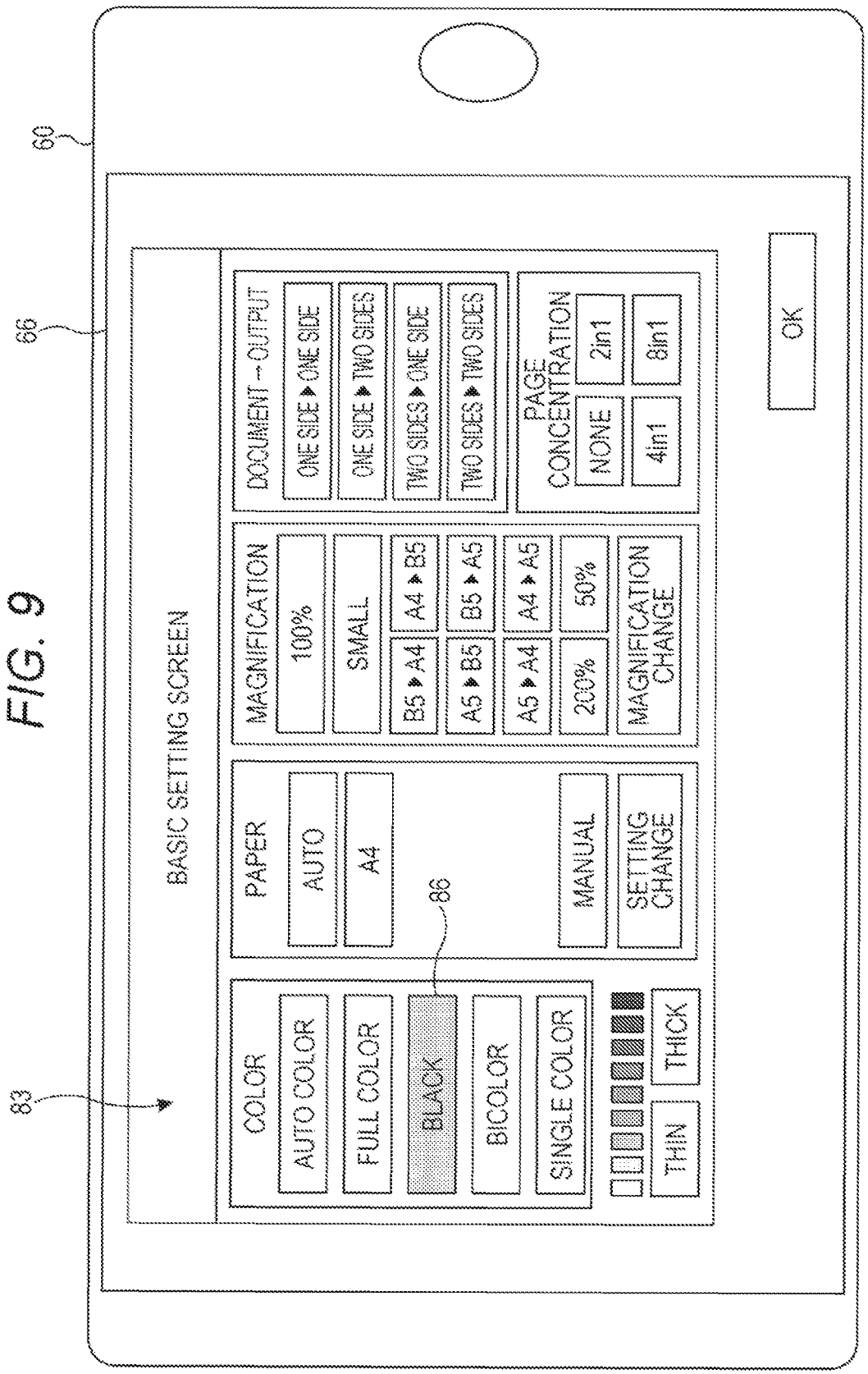
FIG. 9 is a diagram showing the mobile terminal displaying a basic setting screen as an initial screen that has taken over the operation contents shown in FIG. 8.

After that, a communication failure occurs, and the mobile terminal 60 takes over the job input operation being performed by the remote operation panel 40. As a result, the basic setting screen 83 on which "black" has been selected as a color setting is displayed as an initial screen on the mobile terminal 60, as shown in FIG. 9. The user then continues the job input operation, using the mobile terminal 60.

Figure 10:
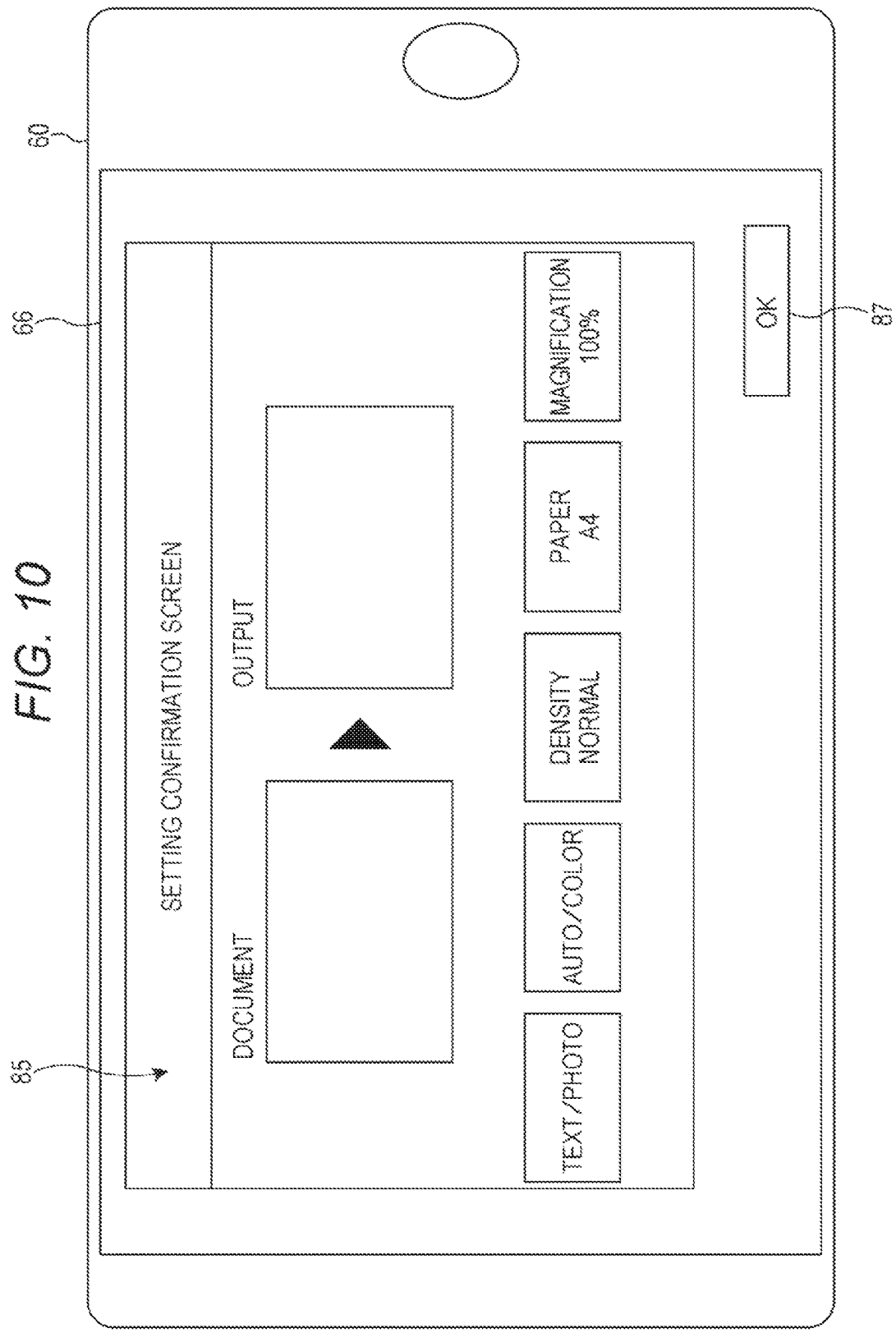
FIG. 10 is a diagram showing the mobile terminal displaying a setting confirmation screen.

When the settings related to the job input are completed, the mobile terminal 60 displays the setting confirmation screen 85 shown in FIG. 10. Upon receipt of an operation of an OK button 87, the mobile terminal 60 creates job setting information that reflects the inherited setting information and the contents of all the operations accepted so far, and transmits the job setting information to the job processing apparatus 10. Receiving the job setting information, the job processing apparatus 10 accepts the job input with the contents of the received information.

Next, determination as to whether to take over a job input operation is described.

The take-over determining unit 35 of the job processing apparatus 10 determines whether to take over a job input operation, using the criteria described below.

<First Take-Over Determination Method>

When a predetermined switch instruction is received from a user, the take-over determining unit 35 determines that a job setting operation being accepted by one terminal is to be taken over by another terminal using another method. For example, when a job take-over instruction is issued from the mobile terminal 60 while the remote operation panel 40 is accepting a job input operation, the job processing apparatus 10 transmits a list of the jobs being accepted to the mobile terminal 60, and causes the mobile terminal 60 to display the list. The mobile terminal 60 is then made to take over a job selected from the list. Alternatively, an identification number is allotted to the job being accepted by the remote operation panel 40, and the user of the remote operation panel 40 is notified of the number. When a job take-over request designating the same identification number is issued from the mobile terminal 60, the mobile terminal 60 is made to take over the job.

<Second Take-Over Determination Method>

When setting information about the same job as the job being accepted by one terminal is received from another terminal, the job setting operation being accepted by the one terminal is determined to be taken over by the other terminal. The same jobs may be jobs having the same identification number or the like, or may be jobs of the same kind. In the case of print jobs, if the files to be printed are the same, the print jobs may be regarded as the same jobs.

<Third Take-Over Determination Method>

If the user who is performing a job setting operation on one terminal is also performing a job setting operation on another terminal, the job setting operation being accepted by the one terminal is determined to be taken over by the other terminal. That is, if the same user is performing a job input operation, the job is determined to be taken over, regardless of the identification of the job.

By any of the above take-over determination methods, it is preferable to determine to take over an operation only if the take-over conditions are satisfied before a predetermined time has passed since the last time a job setting operation was accepted by one terminal. Furthermore, it is possible to determine to take over an operation by any appropriate combination of the first through third take-over determination methods.

Next, combining of job setting information is described.

In a case where an operation being performed by the remote operation panel 40 is to be taken over by the mobile terminal 60, setting information is combined by a first combining method or a second combining method described below.

<First Combining Method>

The job processing apparatus 10 recognizes the contents of an operation in accordance with location information transmitted from the remote operation panel 40, and saves the recognized contents of the operation or the setting information corresponding to the contents of the operation into the saving unit 17*a*. After determining to cause the mobile terminal 60 to take over the operation of the remote operation panel 40, the job processing apparatus 10 converts the setting information corresponding to the contents of the operation saved in the saving unit 17*a* so far or the saved job setting information into data in a predetermined format that can be recognized by the mobile terminal 60 using the second method, and transmits the data and a combining instruction to the mobile terminal 60.

Receiving the data and the combining instruction, the mobile terminal 60 creates and displays an operation screen reflecting the setting information indicated by the data, and accepts the rest of the job setting operation from the user. As the operation screen reflecting the contents of the operation accepted by the remote operation panel 40 is displayed as an initial screen, the contents of the operation being accepted by the remote operation panel 40 are taken over by the mobile terminal 60, and are combined with the rest of the operation.

When the job setting operation from the user is completed, the mobile terminal 60 creates job setting information reflecting all the setting operations, and transmits the setting information to the job processing apparatus 10. The job processing apparatus 10 accepts the job input with the contents indicated by the job setting information received from the mobile terminal 60.

<Second Combining Method>

The job processing apparatus 10 recognizes the contents of an operation in accordance with location information transmitted from the remote operation panel 40, and saves the recognized contents of the operation or the setting information corresponding to the contents of the operation into the saving unit 17*a*. After that, the job processing apparatus 10 merges job setting information received from the mobile terminal 60 and the setting information saved in the saving unit 17*a*, and then accepts a job input. If there is an inconsistency between the settings in this merge, the inconsistency is eliminated in compliance with a predetermined rule before the merge.

For example, a later set value is prioritized in accordance with time stamps, or, in a case where there is an inconsistency between the default setting and a setting according to a user operation, the setting according to the user operation is prioritized. In compliance with such a rule, inconsistencies are eliminated.

When job setting information obtained from one terminal or the contents of an operation obtained from one terminal is saved into the saving unit 17*a*, the setting information or the contents of the operation to be saved is associated with the identification information about the one terminal or the identification information about the user of the one terminal before the saving. That is, job setting information and the contents of operations are saved on a user-by-user basis or on a terminal-by-terminal basis. Furthermore, it may be possible to select which user's or which terminal's operation (s). For example, a list of users or terminals having their setting information saved in the saving unit 17*a* is displayed, and the setting information corresponding to a user or a terminal selected from the list is used as the setting information corresponding to an operation accepted by the terminal to be taken over. The operation is then taken over.

Figure 11:
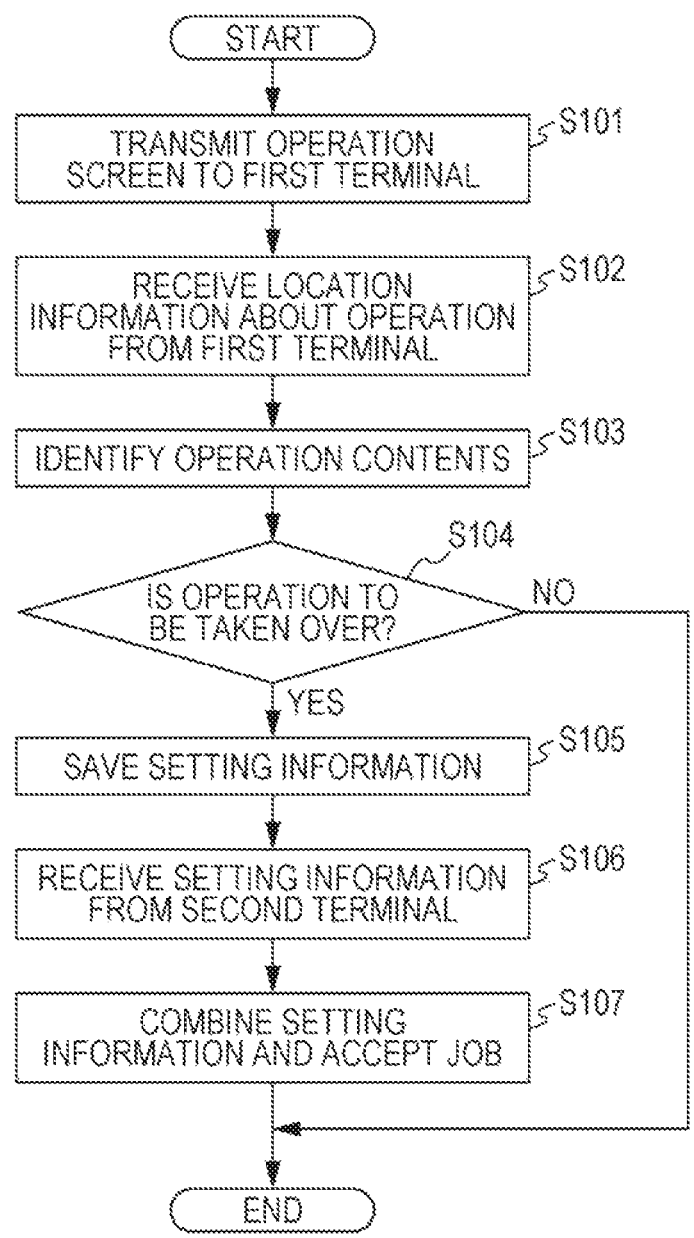
FIG. 11 is a flowchart showing a process to be performed by the job processing apparatus involving an operation take-over function.

FIG. 11 is a flowchart showing a process to be performed by the job processing apparatus 10 involving the operation take-over function. In this example, an operation being accepted by the remote operation panel 40 using the first method is to be taken over by the mobile terminal 60 using the second method. In the flowchart, the remote operation panel 40 is referred to as a first terminal, and the mobile terminal 60 is referred to as a second terminal.

The job processing apparatus 10 transmits the data of an operation screen to the remote operation panel 40 (step S101), and receives location information about the operation from the remote operation panel 40 (step S102). In accordance with the transmitted operation screen and the received location information, the job processing apparatus 10 then identifies (recognizes) the contents of the operation being accepted by the remote operation panel 40 from the user (step S103).

A check is then made to determine whether to cause the mobile terminal 60 to take over the operation being accepted by the remote operation panel 40 (step S104). If the mobile terminal 60 is not to take over the operation (No in step S104), this process comes to an end.

If the mobile terminal 60 is to take over the operation (Yes in step S104), the setting information corresponding to the contents of the operations accepted from the remote operation panel 40 so far is saved into the saving unit 17*a* (step S105). Alternatively, the saving of the setting information may be performed every time the contents of an operation are identified in step S103.

After setting information is received from the mobile terminal 60 (step S106), the setting information saved in the saving unit 17*a* is combined with the setting information received from the mobile terminal 60, and the job is accepted (step S107). This process then comes to an end.

Figure 12:
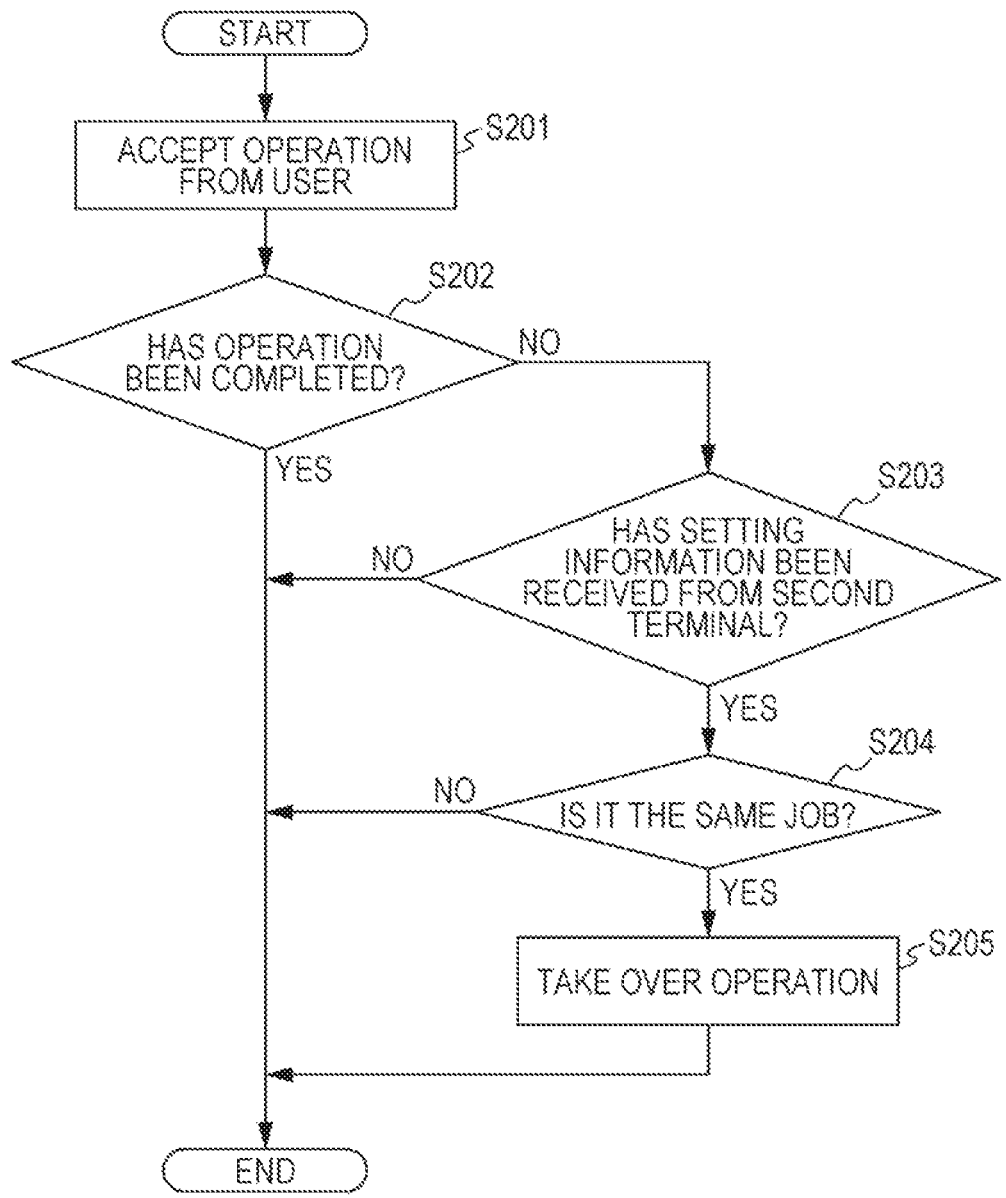
FIG. 12 is a flowchart showing a process to be performed by the job processing apparatus in determining whether to take over an operation by a second take-over determination method.

FIG. 12 is a flowchart showing a process to be performed by the job processing apparatus 10 in determining whether to take over an operation by the above described second take-over determination method. At first, the remote operation panel 40 using the first method is accepting a job input operation from a user (step S201). A check is made to determine whether the job input operation has been completed (step S202). If the operation has been completed (Yes in step S202), this process comes to an end. For example, when the start button 49 is pressed, the job input operation is determined to have been completed.

If the job input operation has not been completed (No in step S202), a check is made to determine whether job setting information has been received from the mobile terminal 60 (step S203). In this example, the operation is to be taken over before a predetermined time has passed since the acceptance of the operation in step S201, or if the setting information has been received from the mobile terminal 60 while the communication with the remote operation panel 40 was cut off.

If the setting information has not been received (No in step S203), the operation is determined not to be taken over, and this process comes to an end. If the job setting information has been received from the mobile terminal 60 (Yes in step S203), a check is made to determine whether the received setting information is about the same job as the job for which the input operation was accepted from the remote operation panel 40 (step S204). If the setting information is not about the same job (No in step S204), the operation is determined not to be taken over, and this process comes to an end. If the setting information is about the same job (Yes in step S204), the job input operation accepted by the remote operation panel 40 is determined to be taken over by the mobile terminal 60 (step S205), and this process then comes to an end.

Figure 13:
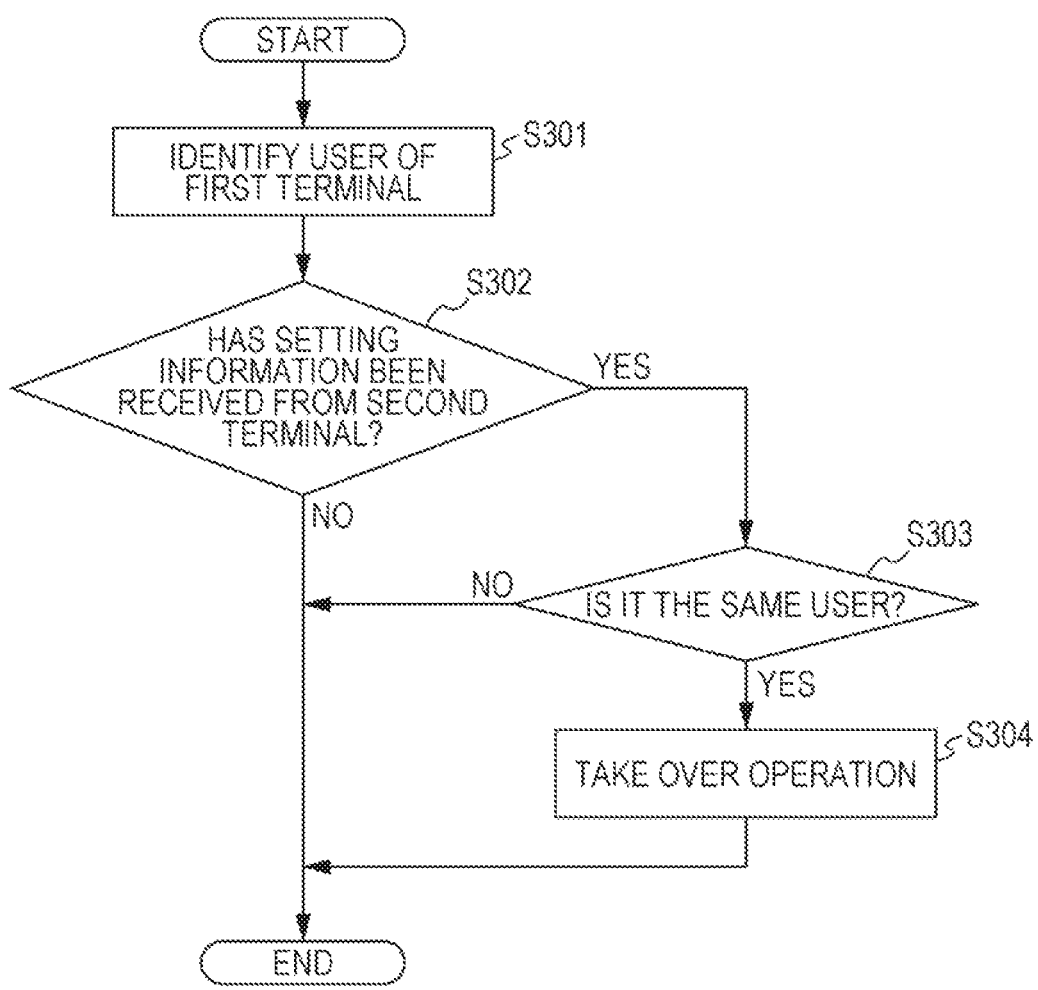
FIG. 13 is a flowchart showing a process to be performed by the job processing apparatus in determining whether to take over an operation by a third take-over determination method.

FIG. 13 is a flowchart showing a process to be performed by the job processing apparatus 10 in determining whether to take over an operation by the above described third take-over determination method. The user who is performing a job input operation through the remote operation panel 40 is identified (step S301). Here, the remote operation panel 40 recognizes the user through the user authenticating unit 48, and transmits the information to the job processing apparatus 10.

Later, if the setting information has not been received from the mobile terminal 60 (No in step S302), the operation is determined not to be taken over, and this process comes to an end. If the setting information has been received from the mobile terminal 60 (Yes in step S302), a check is made to determine whether the user of the mobile terminal 60 is the same as the user of the remote operation panel 40 (step S303). If the user of the mobile terminal 60 is determined not to be the same as the user of the remote operation panel 40 (No in step S303), the operation is determined not to be taken over, and this process comes to an end. If the user of the mobile terminal 60 is determined to be the same as the user of the remote operation panel 40 (Yes in step S303), the operation is determined to be taken over (step S304), and this process comes to an end.

Figure 14:
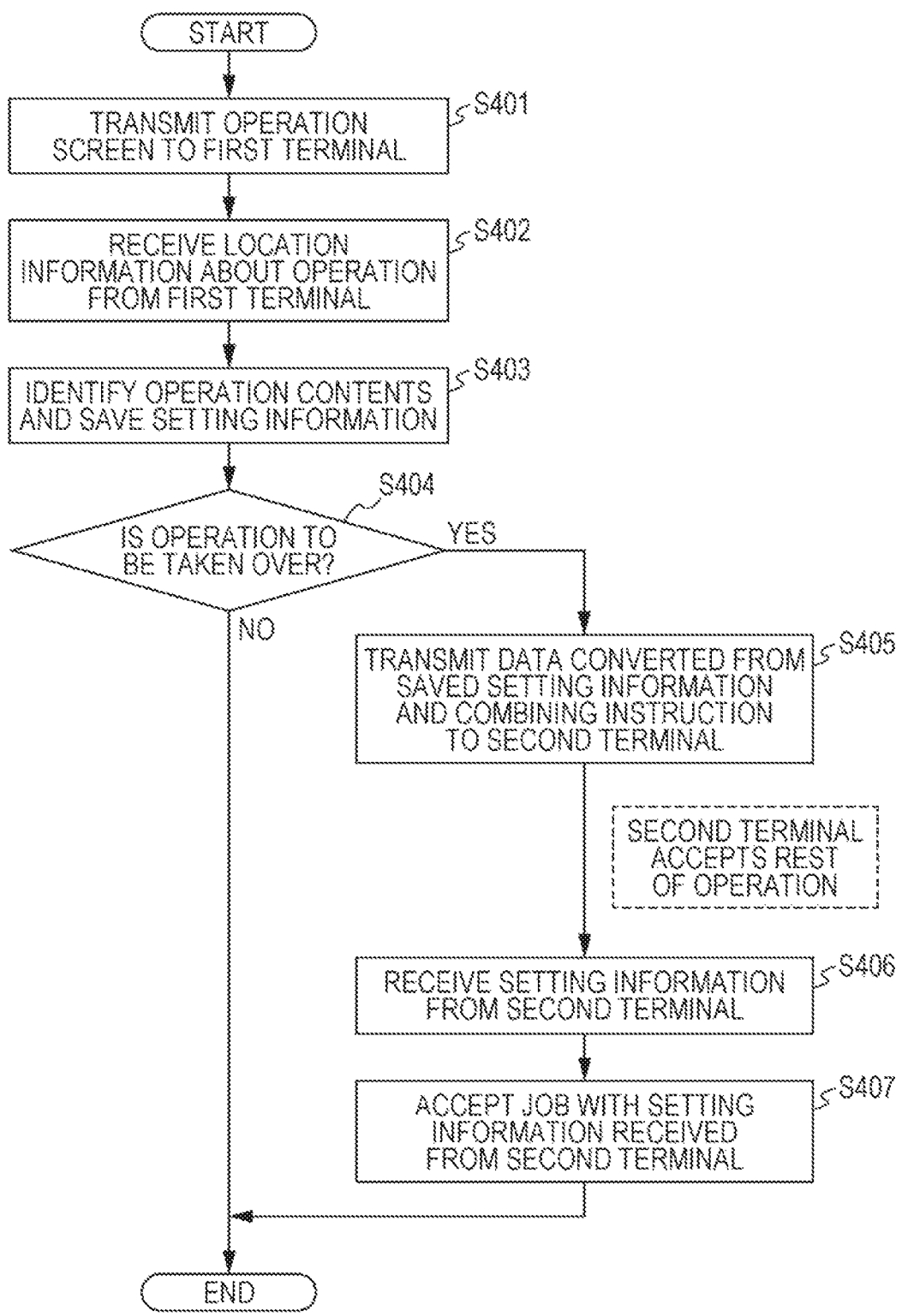
FIG. 14 is a flowchart showing a process to be performed by the job processing apparatus in a case where operations are combined by a first combining method.

FIG. 14 is a flowchart showing a process to be performed by the job processing apparatus 10 in a case where operations are combined by the above described first combining method. The job processing apparatus 10 transmits the data of an operation screen to the remote operation panel 40, and causes the remote operation panel 40 to display the operation screen (step S401). After that, the job processing apparatus 10 receives location information transmitted from the remote operation panel 40 (step S402), identifies (recognizes) the contents of the operation from the operation screen and the location information, and saves the setting information corresponding to the identified operation contents into the saving unit 17*a* (step S403).

After that, a check is made to determine whether to cause the mobile terminal 60 to take over the operation being accepted by the remote operation panel 40 (step S404). If the mobile terminal 60 is not to take over the operation (No in step S404), this process comes to an end. If the mobile terminal 60 is to take over the operation (Yes in step S404), the setting information saved in the saving unit 17*a* so far is converted into data in a predetermined format that can be recognized by the mobile terminal 60 using the second method, and the data and a combining instruction are transmitted to the mobile terminal 60 (step S405).

After that, setting information is received from the mobile terminal 60 (step S406), and the job input is accepted with the contents of the received setting information (step S407). This process then comes to an end.

Figure 15:
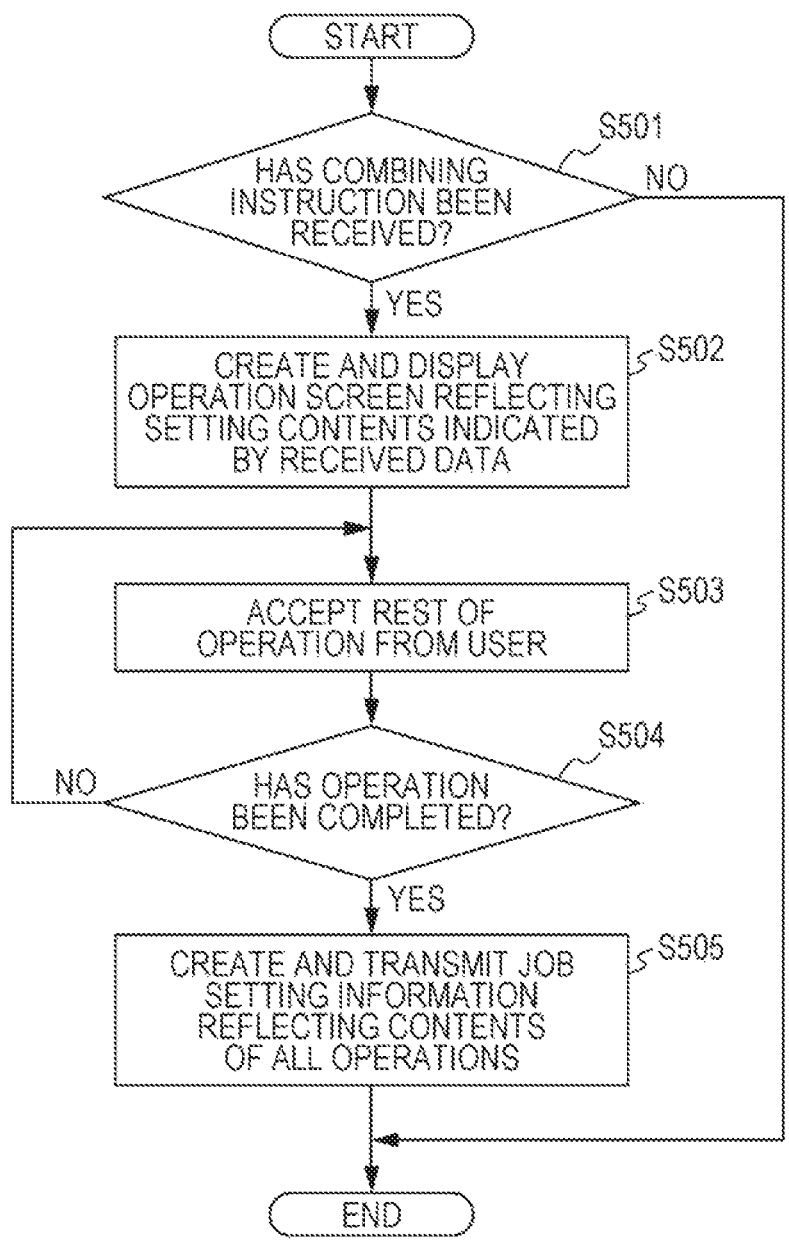
FIG. 15 is a flowchart showing a process to be performed by the mobile terminal in a case where operations are combined by the first combining method.

FIG. 15 is a flowchart showing a process to be performed by the mobile terminal 60 in a case where operations are combined by the above described first combining method. The mobile terminal 60 monitors whether the data corresponding to the setting contents at the terminal to be taken over and a combining instruction are received from the job processing apparatus 10 (step S501). If the data and a combining instruction have not been received (No in step S501), this process comes to an end.

If the data corresponding to the setting contents at the terminal to be taken over and a combining instruction have been received (Yes in step S501), an operation screen reflecting the setting contents indicated by the received data is created, and is displayed on the mobile terminal 60 (step S502). In this example, the respective values registered in a table for registering the set values of the respective setting items of the jobs held in the mobile terminal 60 are initialized with default values, and are then changed in accordance with the setting contents indicated by the received data.

The rest of the job input operation is then accepted from the user, with the displayed operation screen being the initial screen (step S503). Every time an operation is accepted, the values registered in the above described table are updated in accordance with the contents of the operation.

When the job input operation is completed (Yes in step S504), setting information reflecting the contents of all the operations is created and is transmitted to the job processing apparatus 10 (step S505). This process then comes to an end. In this example, setting information reflecting the contents of all the operations is created in the above described table at the point when the job input operation is completed. Therefore, all the contents of the table are transmitted as the job setting information to the job processing apparatus 10.

Next, a case where an operation being accepted by the mobile terminal 60 is taken over by the remote operation panel 40 is described.

When a job input operation is completed, the mobile terminal 60 in normal operation creates job setting information that reflects the contents of all the operations accepted so far, and transmits the job setting information to the job processing apparatus 10. However, a failure, such as a dead battery, occurs during an operation, and accepting the operation might not be continued.

To counter this, when detecting a failure such as a dead battery while accepting a job setting operation, the mobile terminal 60 creates the job setting information corresponding to the job setting operations accepted so far, and transmits the job setting information, together with a take-over instruction, to the job processing apparatus 10.

The job processing apparatus 10 saves the setting information and the take-over instruction received from the mobile terminal 60 into the saving unit 17a. If the job processing apparatus 10 determines that the operation being performed in the mobile terminal 60 is to be taken over by the remote operation panel 40 using the first method, the job processing apparatus 10 creates an operation screen reflecting the setting information that has been received from the mobile terminal 60 and been saved in the saving unit 17a, and transmits the operation screen to the remote operation panel 40, so that the rest of the job setting operation can be accepted by the remote operation panel 40 using the first method.

As described so far, in the job processing system 5 according to this embodiment, a job input operation being accepted by the remote operation panel 40 using the first method can be taken over by the mobile terminal 60 using the second method, so that the job input operation can be completed. Furthermore, a job input operation being accepted by the mobile terminal 60 using the second method can be taken over by the remote operation panel 40 using the first method, so that the job input operation can be completed. Thus, even when a communication defect occurs or the battery runs out, the rest of the operation can be taken over and performed by another appropriate terminal. In this manner, each job input operation can be completed, and user-friendliness is increased.

Although an embodiment of the present invention has been described so far with reference to the accompanying drawings, specific structures are not limited to the embodiment, and modifications and additions within the scope of the invention are included in the present invention.

The second method is not limited to the method described as an example in the embodiment, and may be any appropriate method that differs from the first method.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A job processing system comprising:
   a job processing apparatus configured to execute an input job; and
   a plurality of terminals configured to receive, from a user, an operation to set a job to be input to the job processing apparatus,
   wherein the job processing apparatus includes:
   a processor configured to have: a function of acquiring setting information indicating setting contents of a job for which a terminal has received a setting operation from a user by a first method, the first method being designed for: transmitting data of an operation screen to a terminal and causing the terminal to display the operation screen; receiving, from the terminal, location information indicating a location of an operation received from a user through the operation screen, the location being on the operation screen; and recognizing contents of the operation received by the terminal from the user, in accordance with the received location information and information about the operation screen; and a function of acquiring setting information indicating setting contents of a job for which a terminal has received a setting operation from a user by a second method, the second method being different from the first method; and
   a saving unit configured to save job setting information acquired from a terminal by the processor,
   wherein the processor is configured to:
   determine whether a first job setting operation being accepted by one terminal using one of the first method and the second method is to be taken over by another terminal using the other one of the first method and the second method; and
   combine first job setting information acquired from the one terminal and saved in the saving unit, with setting information about a job corresponding to a job setting operation received from a user by another terminal using the other method, when the processor determines that the first job input operation being accepted by the one terminal is to be taken over by another terminal using the other method, and
   wherein the job processing apparatus accepts an input of the first job in accordance with the setting information combined by the processor.

2. The job processing system according to claim 1, wherein the second method is a method by which a terminal recognizes setting contents of a job corresponding to a job setting operation accepted from a user, and the terminal transmits setting information indicating the recognized setting contents of the job to the job processing apparatus.

3. The job processing system according to claim 1, wherein, when receiving a predetermined switch instruction from a user, the processor determines that the first job setting operation being accepted by the one terminal is to be taken over by another terminal using the other method.

4. The job processing system according to claim 1, wherein, when receiving setting information about the same job as the first job from the another terminal, the processor determines that the first job setting operation being accepted by the one terminal is to be taken over by the another terminal.

5. The job processing system according to claim 1, wherein, when the same user as the user performing the first job setting operation on the one terminal performs a job setting operation on the another terminal, the processor determines that the first job setting operation being accepted by the one terminal is to be taken over by the another terminal.

6. The job processing system according to claim 1, wherein
   when the one terminal uses the first method, the processor converts the first job setting information saved in the saving unit into data in a predetermined format recognizable to the another terminal using the second method, and transmits the data and a combining instruction to the another terminal,
   the another terminal receives the data and the combining instruction, creates and displays an operation screen reflecting the setting information indicated by the data, accepts the rest of the first job setting operation from the user, and, when the first job setting operation is completed, creates and transmits first job setting information reflecting all setting operations to the job processing apparatus, and
   the job processing apparatus accepts the input of the first job in accordance with the first job setting information received from the another terminal.

7. The job processing system according to claim 1, wherein, in combining the first job setting information acquired from the one terminal and saved in the saving unit with setting information about a job corresponding to a job setting operation accepted from a user by another terminal using the other method, if there is an inconsistency in the setting information, the processor eliminates the inconsistency in compliance with a predetermined rule, and combines the first job setting information acquired from the one terminal and saved in the saving unit with the setting information about the job corresponding to the job setting operation accepted by the another terminal using the other method from a user.

8. The job processing system according to claim 1, wherein
when a failure hindering a continuance of the first job setting operation is detected while the one terminal is accepting the first job setting operation, the one terminal using the second method creates first job setting information corresponding to job setting operations accepted so far, and transmits the first job setting information to the job processing apparatus, and
when the first job setting operation is determined to be taken over by another terminal using the first method, the job processing apparatus creates an operation screen reflecting the first job setting information received from the one terminal using the second method and saved in the saving unit, and transmits the operation screen to another terminal using the first method, and the another terminal accepts the rest of the first job setting operation.

9. The job processing system according to claim 1, wherein
the saving unit associates job setting information acquired from one terminal with identification information about the one terminal or a user of the one terminal before saving the job setting information, and
setting information to be taken over is selected from the setting information saved for respective pieces of the identification information in the saving unit.

10. A job processing apparatus that receives a job input from a terminal and executes the job,
the job processing apparatus comprising:
a processor configured to have: a function of acquiring setting information indicating setting contents of a job for which a terminal has received a setting operation from a user by a first method, the first method being designed for: transmitting data of an operation screen to a terminal and causing the terminal to display the operation screen; receiving, from the terminal, location information indicating a location of an operation received from a user through the operation screen, the location being on the operation screen; and recognizing contents of the operation received by the terminal from the user, in accordance with the received location information and information about the operation screen; and a function of acquiring setting information indicating setting contents of a job for which a terminal has received a setting operation from a user by a second method, the second method being different from the first method; and
a saving unit configured to save job setting information acquired from a terminal by the processor,
wherein the processor is configured to:
determine whether a first job setting operation being accepted by one terminal using one of the first method and the second method is to be taken over by another terminal using the other one of the first method and the second method; and
combine first job setting information acquired from the one terminal and saved in the saving unit, with setting information about a job corresponding to a job setting operation received from a user by another terminal using the other method, when the processor determines that the first job input operation being accepted by the one terminal is to be taken over by another terminal using the other method, and
wherein an input of the first job is accepted in accordance with the setting information combined by the combining unit.

11. The job processing apparatus according to claim 10, wherein the second method is a method by which a terminal recognizes setting contents of a job corresponding to a job setting operation accepted from a user, and the terminal transmits setting information indicating the recognized setting contents of the job to the job processing apparatus.

12. The job processing apparatus according to claim 10, wherein, when receiving a predetermined switch instruction from a user, the processor determines that the first job setting operation being accepted by the one terminal is to be taken over by another terminal using the other method.

13. The job processing apparatus according to claim 10, wherein, when receiving setting information about the same job as the first job from the another terminal, the processor determines that the first job setting operation being accepted by the one terminal is to be taken over by the another terminal.

14. The job processing apparatus according to claim 10, wherein, when the same user as the user performing the first job setting operation on the one terminal performs a job setting operation on the another terminal, the processor determines that the first job setting operation being accepted by the one terminal is to be taken over by the another terminal.

15. The job processing apparatus according to claim 10, wherein
when the one terminal uses the first method, the processor converts the first job setting information saved in the saving unit into data in a predetermined format recognizable to the another terminal using the second method, and transmits the data and a combining instruction to the another terminal, and
the job processing apparatus receives first job setting information reflecting all setting operations from the another terminal, and accepts the first job input in accordance with the setting information, the another terminal receiving the data and the combining instruction, the another terminal creating and displaying an operation screen reflecting the setting information indicated by the data, the another terminal accepting the rest of the first job setting operation from the user, the another terminal creating and transmitting the first job setting information reflecting all the setting operations when the first job setting operation is completed.

16. The job processing apparatus according to claim 10, wherein, in combining the first job setting information acquired from the one terminal and saved in the saving unit with setting information about a job corresponding to a job setting operation accepted from a user by another terminal using the other method, if there is an inconsistency in the setting information, the processor eliminates the inconsistency in compliance with a predetermined rule, and combines the first job setting information acquired from the one terminal and saved in the saving unit with the setting information about the job corresponding to the job setting operation accepted by the another terminal using the other method from the user.

17. The job processing apparatus according to claim 10, wherein when a failure hindering a continuance of the first job setting operation is detected while the one terminal is accepting the first job setting operation, the one terminal using the second method creates first job setting information corresponding to job setting operations accepted so far, and transmits the first job setting information to the job processing apparatus, and, when the processor determines that the first job setting operation is to be taken over by another terminal using the first method, an operation screen reflecting the first job setting information received from the one terminal using the second method and saved in the saving unit is created and is transmitted to the another terminal using the first method, and the another terminal accepts the rest of the first job setting operation.

18. The job processing apparatus according to claim 10, wherein the saving unit associates job setting information acquired from one terminal with identification information about the one terminal or a user of the one terminal before saving the job setting information, and setting information to be taken over is selected from the setting information saved for respective pieces of the identification information in the saving unit.

19. A non-transitory recording medium storing a computer readable program to be executed in a job processing apparatus that receives a job input from a terminal and executes the job, the program comprising:

a remote operation accepting step of performing: a process of acquiring setting information indicating setting contents of a job for which a terminal has received a setting operation from a user by a first method, the first method being designed for: transmitting data of an operation screen to a terminal and causing the terminal to display the operation screen; receiving, from the terminal, location information indicating a location of an operation received from a user through the operation screen, the location being on the operation screen; and recognizing contents of the operation received by the terminal from the user, in accordance with the received location information and information about the operation screen; and a process of acquiring setting information indicating setting contents of a job for which a terminal has received a setting operation from a user by a second method, the second method being different from the first method;

a saving step of saving, into a saving unit, job setting information acquired from a terminal in the remote operation accepting step;

a take-over determining step of determining whether a first job setting operation being accepted by one terminal using one of the first method and the second method is to be taken over by another terminal using the other one of the first method and the second method;

a combining step of combining first job setting information acquired from the one terminal and saved in the saving unit, with setting information about a job corresponding to a job setting operation received from a user by another terminal using the other method, when the first job input operation being accepted by the one terminal is determined to be taken over by another terminal using the other method in the take-over determining step; and a step of accepting an input of the first job in accordance with the setting information combined in the combining step.

20. The non-transitory recording medium storing a computer readable program according to claim 19, wherein the second method is a method by which a terminal recognizes setting contents of a job corresponding to a job setting operation accepted from a user, and the terminal transmits setting information indicating the recognized setting contents of the job to the job processing apparatus.

21. The non-transitory recording medium storing a computer readable program according to claim 19, wherein, when a predetermined switch instruction is received from a user, the first job setting operation being accepted by the one terminal is determined to be taken over by another terminal using the other method in the take-over determining step.

22. The non-transitory recording medium storing a computer readable program according to claim 19, wherein, when setting information about the same job as the first job is received from the another terminal, the first job setting operation being accepted by the one terminal is determined to be taken over by the another terminal in the take-over determining step.

23. The non-transitory recording medium storing a computer readable program according to claim 19, wherein, when the same user as the user performing the first job setting operation on the one terminal performs a job setting operation on the another terminal, the first job setting operation being accepted by the one terminal is determined to be taken over by the another terminal in the take-over determining step.

24. The non-transitory recording medium storing a computer readable program according to claim 19, wherein when the one terminal uses the first method, the first job setting information saved in the saving unit is converted into data in a predetermined format recognizable to the another terminal using the second method, and the data and a combining instruction are transmitted to the another terminal in the combining step, and first job setting information reflecting all setting operations is received from the another terminal, and an input of the first job is accepted in accordance with the setting information, the another terminal receiving the data and the combining instruction, the another terminal creating and displaying an operation screen reflecting the setting information indicated by the data, the another terminal accepting the rest of the first job setting operation from the user, the another terminal creating and transmitting the first job setting information reflecting all the setting operations when the first job setting operation is completed.

25. The non-transitory recording medium storing a computer readable program according to claim 19, wherein, in combining the first job setting information acquired from the one terminal and saved in the saving unit with setting information about a job corresponding to a job setting operation accepted from a user by another terminal using the other method in the combining step, if there is an inconsistency in the setting information, the inconsistency is eliminated in compliance with a predetermined rule, and the first job setting information acquired from the one terminal and saved in the saving unit is combined with the setting information about the job corresponding to the job setting operation accepted by the another terminal using the other method from a user.

26. The non-transitory recording medium storing a computer readable program according to claim 19, wherein when a failure hindering a continuance of the first job setting operation is detected while the one terminal is accepting the first job setting operation, the one terminal using the second method creates first job setting information corresponding to job setting operations accepted so far, and transmits the first job setting information to the job processing apparatus, and, when the first job setting operation is determined to be taken over by another terminal using the first method in the take-over determining step, an operation screen reflecting the first job setting information received from the one terminal using the second method and saved in the saving unit is created and is transmitted to the another terminal using the first method in the combining step, and the another terminal accepts the rest of the first job setting operation.

27. The non-transitory recording medium storing a computer readable program according to claim 19, wherein in the saving step, job setting information acquired from one terminal is associated with identification information about the one terminal or a user of the one terminal, and is saved into the saving unit, and the program further comprises a step of selecting setting information to be taken over from the setting information saved for respective pieces of the identification information in the saving unit.

28. A method implemented in a job processing apparatus that receives a job input from a terminal and executes the job, the method comprising:

a remote operation accepting step of performing: a process of acquiring setting information indicating setting contents of a job for which a terminal has received a setting operation from a user by a first method, the first method being designed for: transmitting data of an operation screen to a terminal and causing the terminal to display the operation screen; receiving, from the terminal, location information indicating a location of an operation received from a user through the operation screen, the location being on the operation screen; and recognizing contents of the operation received by the terminal from the user, in accordance with the received location information and information about the operation screen; and a process of acquiring setting information indicating setting contents of a job for which a terminal has received a setting operation from a user by a second method, the second method being different from the first method;

a saving step of saving, into a saving unit, job setting information acquired from a terminal in the remote operation accepting step;

a take-over determining step of determining whether a first job setting operation being accepted by one terminal using one of the first method and the second method is to be taken over by another terminal using the other one of the first method and the second method;

a combining step of combining first job setting information acquired from the one terminal and saved in the saving unit, with setting information about a job corresponding to a job setting operation received from a user by another terminal using the other method, when the first job input operation being accepted by the one terminal is determined to be taken over by another terminal using the other method in the take-over determining step; and a step of accepting an input of the first job in accordance with the setting information combined in the combining step.

* * * * *